US012307971B2

(12) United States Patent
Lee et al.

(10) Patent No.: US 12,307,971 B2
(45) Date of Patent: May 20, 2025

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Hyun Soo Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/543,613

(22) Filed: Dec. 18, 2023

(65) Prior Publication Data

US 2024/0119902 A1 Apr. 11, 2024

Related U.S. Application Data

(62) Division of application No. 17/840,072, filed on Jun. 14, 2022, now Pat. No. 11,908,405.

(30) Foreign Application Priority Data

Jul. 8, 2021 (KR) ........................ 10-2021-0089923
Nov. 29, 2021 (KR) ........................ 10-2021-0166802

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0426* (2013.01); *G09G 2300/0842* (2013.01)

(58) Field of Classification Search
CPC ... G09G 2300/0819; G09G 2300/0861; G09G 2300/0426; G09G 2300/043;
(Continued)

(56) References Cited

U.S. PATENT DOCUMENTS 8,797,318 B2 8/2014 Yoo et al.
2005/0030264 A1* 2/2005 Tsuge .................. G09G 3/3283 345/76

(Continued)

FOREIGN PATENT DOCUMENTS

KR 10-2009-0095913 A 9/2009
KR 10-2012-0019632 A 3/2012

(Continued)

OTHER PUBLICATIONS

Korean Intellectual Property Office, Office Action, Korean Patent Application No. 10-2021-0166802, Dec. 13, 2023, 13 pages.

*Primary Examiner* — Dong Hui Liang
(74) *Attorney, Agent, or Firm* — Fenwick & West LLP

(57) ABSTRACT

A pixel circuit and a display device including the same are disclosed. The pixel circuit of this disclosure includes a driving element including a first electrode connected to a first node to which a pixel driving voltage is applied, a gate electrode connected to a second node, and a second electrode connected to a third node, and configured to supply an electric current to a light emitting element; a first switch element configured to be turned on according to a gate-on voltage of a scan pulse to supply a data voltage to the second node; and a second switch element configured to be turned off according to a gate-off voltage of a light emitting control pulse generated in antiphase of the scan pulse.

14 Claims, 16 Drawing Sheets

(58) Field of Classification Search
CPC ........... G09G 3/3233; G09G 2320/043; G09G 2320/0233; G09G 2320/045; G09G 2320/0247
See application file for complete search history.

(56) References Cited

U.S. PATENT DOCUMENTS

| | | | | |
|---|---|---|---|---|
| 2006/0170628 | A1* | 8/2006 | Yamashita | G09G 3/3233 345/76 |
| 2012/0050274 | A1 | 3/2012 | Yoo et al. | |
| 2016/0171930 | A1 | 6/2016 | Song et al. | |
| 2016/0260380 | A1* | 9/2016 | Yang | G09G 3/32 |
| 2017/0270867 | A1* | 9/2017 | Zhu | G09G 3/3233 |
| 2021/0327347 | A1 | 10/2021 | Xu | |
| 2022/0310009 | A1 | 9/2022 | Wang | |

FOREIGN PATENT DOCUMENTS

| | | | |
|---|---|---|---|
| KR | 10-2014-0034361 | A | 3/2014 |
| KR | 10-2015-0059604 | A | 6/2015 |
| KR | 10-2020-0036415 | A | 4/2020 |
| KR | 10-2021-0050384 | A | 5/2021 |

* cited by examiner

PIXEL CIRCUIT AND DISPLAY DEVICE INCLUDING THE SAME

CROSS-REFERENCE TO RELATED APPLICATIONS

This application is a divisional of U.S. patent application Ser. No. 17/840,072 filed on Jun. 14, 2022, which claims priority to and the benefit of Republic of Korea Patent Application No. 10-2021-0089923, filed Jul. 8, 2021, and Republic of Korea Patent Application No. 10-2021-0166802, filed Nov. 29, 2021, each of which is incorporated by reference in its entirety.

1. FIELD

This disclosure relates to a pixel circuit and a display device including the same.

2. DISCUSSION OF RELATED ART

An electroluminescence display device may be divided into an inorganic light emitting display device and an organic light emitting display device according to the material of the emission layer. The active matrix type organic light emitting display device includes an organic light emitting diode (hereinafter, referred to as "OLED") that emits light by itself, and has the advantage of fast response speed, high light-emitting efficiency, high luminance and wide viewing angle. In the organic light emitting display device, the OLED (organic light emitting diode) is formed in each pixel. The organic light emitting display device has a fast response speed, excellent light-emitting efficiency, luminance, and viewing angle, and has also excellent contrast ratio and color reproducibility because black gray scale can be expressed as complete black.

A pixel circuit of an organic light emitting display device includes a light emitting element, a driving element for driving the light emitting element, and one or more switch elements. The switch elements are turned on/off according to the gate voltage to connect or block main nodes of the pixel circuit. The driving element and the switch elements may be implemented as transistors.

A low-potential power supply voltage is commonly applied to the pixels of the organic light emitting display device. In the pixel circuit, when a switch element connected to the low-potential power supply voltage through the capacitor is turned on, a ripple may be generated in the low-potential power supply voltage. In this case, the current flowing through the light emitting element may be changed, which, in turn, may result in the change in the luminance of the pixels. When an image of a crosstalk pattern is displayed on a screen, the ripple of the low-potential power supply voltage may cause non-uniformity in the state of charge between the pixel lines, thereby causing a difference in luminance between the pixel lines.

SUMMARY

The disclosure has been made in an effort to address aforementioned necessities and/or drawbacks.

This disclosure provides a pixel circuit capable of preventing or at least reducing image quality deterioration due to a ripple of a low-potential power supply voltage commonly applied between pixels, and a display device including the same.

The drawbacks which this disclosure addresses are not limited to the aforementioned ones, but other drawbacks which can be solved by this disclosure will become apparent to those skilled in the art from the description below.

A pixel circuit according to an embodiment of this disclosure includes a driving element including a first electrode connected to a first node to which a pixel driving voltage is applied, a gate electrode connected to a second node, and a second electrode connected to a third node, and configured to supply an electric current to a light emitting element; a first switch element configured to be turned on according to a gate-on voltage of a scan pulse to supply a data voltage to the second node; a second switch element configured to be turned off according to a gate-off voltage of a light emitting control pulse generated in antiphase of the scan pulse; and a capacitor configured to be connected between the second node and the third node.

A pixel circuit according to another embodiment of this disclosure includes a driving element including a first electrode connected to a first node to which a pixel driving voltage is applied, a gate electrode connected to a second node, and a second electrode connected to a third node, and configured to supply an electric current to a light emitting element; a first switch element configured to be turned on according to a gate-on voltage of a scan pulse to supply a data voltage to the second node; a second switch element configured to be turned off according to a gate-off voltage of a light emitting control pulse; a third switch element configured to be turned on according to a gate-on voltage of a sensing pulse to supply a reference voltage to the third node; and a capacitor configured to be connected between the second node and the third node. The light emitting control pulse is generated as an antiphase pulse of the sensing pulse.

A pixel circuit according to yet another embodiment of this disclosure includes a driving element including a first electrode connected to a first node to which a first constant voltage is applied, a gate electrode connected to a second node, and a second electrode connected to a third node, and configured to supply an electric current to a light emitting element; a first switch element configured to be turned on according to a gate-on voltage of a first gate pulse to supply a data voltage to the second node; a second switch element configured to be turned off according to a gate-off voltage of a second gate pulse; a third switch element configured to be turned on according to a gate-on voltage of a third gate pulse to supply a second constant voltage to the third node; a fourth switch element configured to be turned on according to a gate-on voltage of a fourth gate pulse to apply a third constant voltage to the second node; and a capacitor configured to be connected between the second node and the third node.

The second gate pulse is inverted to the gate-off voltage when the third gate pulse is inverted to the gate-on voltage, and is inverted to the gate-on voltage when the first gate pulse is inverted to the gate-on voltage.

A pixel circuit according to another embodiment of this disclosure includes a driving element including a first electrode connected to a first node, a first gate electrode connected to a second node, a second electrode connected to a third node, and a second gate electrode connected to a fourth node; a light emitting element including an anode electrode connected to the fourth node and a cathode electrode to which a low-potential power supply voltage is applied, and configured to be driven according to an electric current from the driving element; a first switch element configured to be turned on according to a gate-on voltage of a first scan pulse to supply a data voltage to a fifth node; a second switch element connected between the third node and the fourth node to be turned off according to a gate-off voltage of a second light emitting control pulse; a third switch element configured to be turned on according to a gate-on voltage of a third scan pulse to supply a reference voltage to the third node; a fourth switch element configured to be turned on according to a gate-on voltage of a second scan pulse to connect the first gate electrode of the driving element with the first electrode of the driving element; a fifth switch element configured to be turned off according to a gate-off voltage of a first light emitting control pulse to block an electric current path between a power line to which the pixel driving voltage is applied and the first node; a sixth switch element configured to be turned on according to the gate-on voltage of the second scan pulse to supply an initialization voltage to the fifth node; a seventh switch element configured to be turned on according to the gate-on voltage of the third scan pulse to supply the initialization voltage to the fourth node; a first capacitor connected between the second node and the fifth node; and a second capacitor connected between the third node and the fifth node.

The second light emitting control pulse is generated as a gate-off voltage when the second scan pulse or the third scan pulse is the gate-on voltage, or it is generated as the gate-off voltage when the second scan pulse is the gate-on voltage.

A pixel circuit according to another embodiment of this disclosure includes a driving element including a first electrode connected to a first node, a gate electrode connected to a second node, and a second electrode connected to a third node, and configured to supply an electric current to a light emitting element; a first switching element configured to be turned on according to a gate-on voltage of a first scan pulse to supply a data voltage to the second node; a second switching element configured to be turned off according to a gate-off voltage of a second light emitting control pulse to block a current path between the driving element and the light emitting element; a third switching element configured to be turned on according to a gate-on voltage of the third scan pulse to supply a initialization voltage to the third node, a fourth switching element configured to be turned on according to a gate-on voltage of a second scan pulse to supply a reference voltage to the second node; a fifth switching element configured to be turned on according to a gate-on voltage of a first light emission control pulse to supply a pixel driving voltage to the first node; a first capacitor connected between the second node and a fourth node; and a second capacitor, one end of which being connected to the fourth node and the other end of which being applied with the pixel driving voltage. The second light emitting control pulse is inverted to a gate-off voltage when the third scan pulse is inverted to a gate-on voltage, and is inverted to a gate-on voltage when the first scan pulse is inverted to a gate-on voltage.

The display device of this disclosure includes at least one of the aforementioned pixel circuits.

This disclosure can alleviate the ripple defect of the low-potential power supply voltage by blocking the electric current path between the driving element and the light emitting element in a section where ripple can occur in the low-potential power supply voltage commonly applied to the pixels.

This disclosure can realize a narrow bezel of a display device by generating a signal for controlling a switch element for blocking the electric current path by receiving an output signal of a shift register that outputs another gate pulse.

Effects of this disclosure are not limited to the effects mentioned above, and other effects not mentioned above will be clearly appreciated by those skilled in the art from the appended claims.

BRIEF DESCRIPTION OF DRAWINGS

The above and other objects, features and advantages of the present invention will become more apparent to those skilled in the art by describing exemplary embodiments thereof in detail with reference to the accompanying drawings, in which.

DETAILED DESCRIPTION

Figure 1:
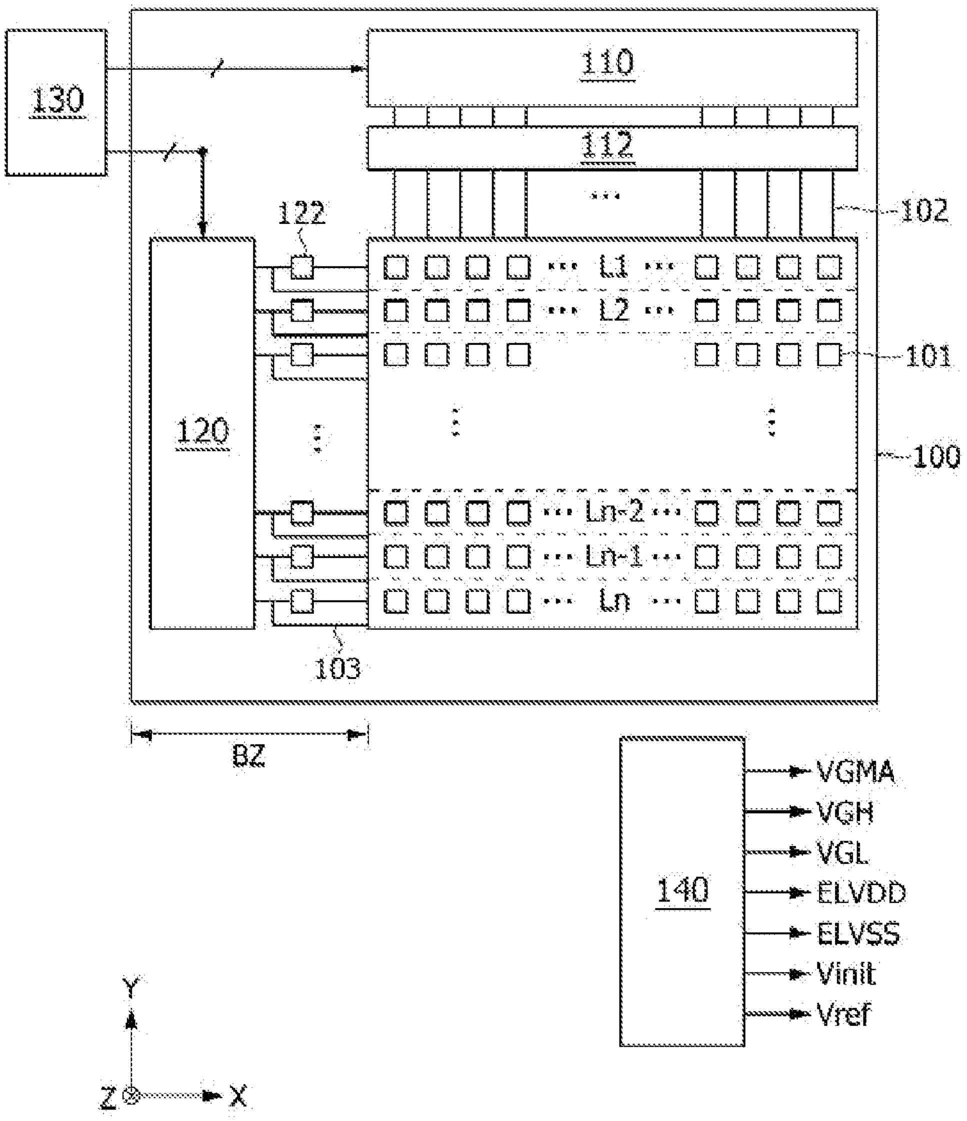
FIG. 1 is a block diagram showing a display device according to an embodiment of this disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a TFT (thin film transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In the embodiments described herein, description are given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage less than a drain voltage such that electrons may flow from a source to a drain. The n-channel transistor has a direction of a current flowing from the drain to the source. In the case of a p-channel transistor, since carriers are holes, a source voltage is greater than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage greater than a threshold voltage of a transistor, and the gate-off voltage is set to a voltage less than the threshold voltage of the transistor.

The transistor is turned on in response to the gate-on voltage and is turned off in response to the gate-off voltage. In the case of an n-channel transistor, a gate-on voltage may be a gate high voltage VGH, and a gate-off voltage may be a gate low voltage VGL.

Hereinafter, various embodiments of this disclosure will be described with reference to the accompanying drawings. In the following embodiments, the display device will be described mainly with respect to the organic light emitting display device, but this disclosure is not limited thereto. Also, the scope of this disclosure is not intended to be limited by the names of components or signals in the following embodiments and claims.

Figure 2:
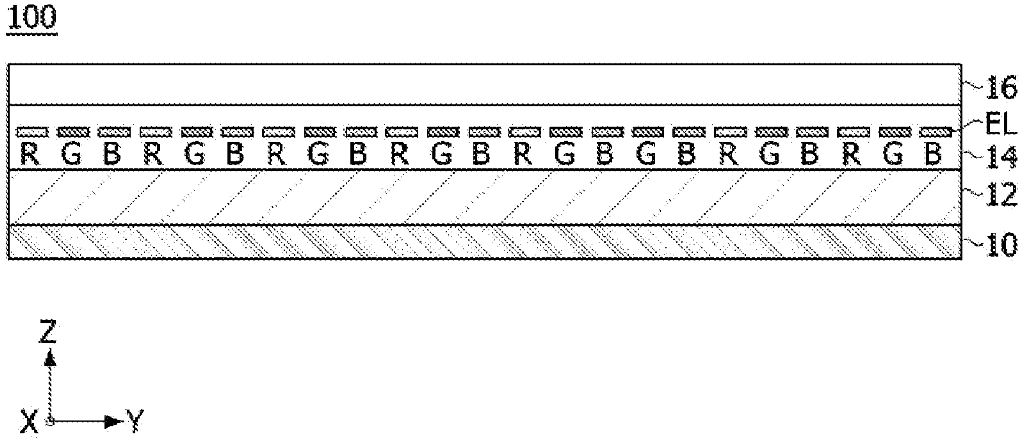
FIG. 2 is a cross-sectional view showing a cross-sectional structure of the display panel shown in FIG. 1 according to an embodiment of this disclosure.

Referring to FIGS. 1 and 2, a display device according to an embodiment of this disclosure includes a display panel 100, a display panel driver for writing pixel data to pixels of the display panel 100, and a power supply 140 for generating power required to drive the pixels and the display panel driver.

The display panel 100 may be a panel having a rectangular structure with a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 crossing the data lines 102, and pixels arranged in a matrix form. The display panel 100 may further include power lines commonly connected to the pixels. The power lines supply a substantially constant voltage required for driving the pixels 101 to the pixels 101. For example, the display panel 100 may include a VDD line to which a pixel driving voltage ELVDD is applied, and a VSS line to which a low-potential power supply voltage ELVSS is applied. In addition, the power lines may further include a REF line to which the reference voltage Vref is applied, and an INIT line to which the initialization voltage Vinit is applied.

As shown in FIG. 2, the cross-sectional structure of the display panel 100 may include a circuit layer 12 stacked on a substrate 10, a light emitting element layer 14, and an encapsulation layer 16 according to an embodiment.

The circuit layer 12 may include a TFT array including a pixel circuit connected to wires such as a data line, a gate line, a power line, and the like, a de-multiplexer array 112, a gate driver 120 and the like. The wire and circuit elements of the circuit layer 12 may include a plurality of insulating layers, two or more metal layers separated with the insulating layer therebetween, and an active layer including a semiconductor material. All transistors formed in the circuit layer 12 may be implemented as an n-channel oxide TFT.

The light emitting element layer 14 may include a light emitting element EL driven by the pixel circuit. The light emitting element EL may include a red (R) light emitting element, a green (G) light emitting element, and a blue (B) light emitting element. In another embodiment, the light emitting element layer 14 may include a white light emitting element and a color filter. The light emitting elements EL of the light emitting element layer 14 may be covered by multiple protective layers in which an organic layer and an inorganic layer are stacked.

The encapsulation layer 16 covers the light emitting element layer 14 to seal the circuit layer 12 and the light emitting element layer 14. The encapsulation layer 16 may also have a multi-insulating film structure in which an organic film and an inorganic film are alternately stacked. The inorganic film blocks or at least reduces permeation of moisture and oxygen. The organic film planarizes the surface of the inorganic film. When the organic layer and the inorganic layer are stacked in multiple layers, the movement path of moisture or oxygen becomes longer than that of a single layer, so that penetration of moisture and oxygen affecting the light emitting element layer 14 can be effectively blocked or at least reduced.

A touch sensor layer omitted from the drawing may be formed on the encapsulation layer 16, and a polarizer or a color filter layer may be disposed thereon. The touch sensor layer may include capacitive touch sensors that sense a touch input based on a change in capacitances before and after the touch input. The touch sensor layer may include insulating layers and metal wire patterns forming the capacitance of the touch sensors. The insulating layers may insulate the crossing portions of the metal wire patterns, and may planarize the surface of the touch sensor layer. The polarizer may improve visibility and contrast ratio by converting the polarization of external light reflected by the metal of the touch sensor layer and the circuit layer. The polarizer may be implemented as a polarizer or a circular polarizer to which a linear polarizer and a phase retardation film are bonded. A cover glass may be adhered to the polarizer. The color filter layer may include red, green, and blue color filters. The color filter layer may further include a black matrix pattern. The color filter layer absorbs a portion of the wavelength of light reflected from the circuit layer and the touch sensor layer, so that it can replace the polarizer and increase the color purity of the image reproduced in the pixel array.

The pixel array includes a plurality of pixel lines L1 to Ln. Each of the pixel lines L1 to Ln includes one line of pixels arranged along the line direction (X-axis direction) in the pixel array of the display panel 100. The pixels arranged in one pixel line share gate lines 103. Sub-pixels arranged in the column direction Y along the data line direction share the same data line 102. One horizontal period is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

Each of the pixels 101 may be divided into a red sub-pixel, a green sub-pixel, and a blue sub-pixel to implement color. Each of the pixels may further include a white sub-pixel. Each of the sub-pixels includes a pixel circuit. Hereinafter, a pixel may be interpreted as having the same meaning as a sub-pixel. Each of the pixel circuits is connected to a data line, gate lines, and power lines.

The pixels may be arranged as real color pixels and pentile pixels. The pentile pixel may implement a higher resolution than a real color pixel by driving two sub-pixels having different colors as one pixel 101 using a preset pixel rendering algorithm. The pixel rendering algorithm may compensate for insufficient color representation in each pixel with the color of light emitted from an adjacent pixel.

The power supply 140 generates a direct current (DC) voltage (or a constant voltage) required for driving the pixel array of the display panel 100 and the display panel driver by using a DC-DC converter. The DC-DC converter may include a charge pump, a regulator, a buck converter, a boost converter, and the like. The power supply 140 may generate DC voltage (or constant voltage) such as the gamma reference voltage VGMA, gate-on voltage VGH, gate-off voltage VGL, pixel driving voltage ELVDD, low-potential power supply voltage ELVSS, initialization voltage Vinit, reference voltage Vref, or the like by adjusting the level of the DC input voltage applied from the host system (not shown). The gamma reference voltage VGMA is supplied to the data driver 110. The gate-on voltage VGH and the gate-off voltage VGL are supplied to the gate driver 120. The constant voltage such as pixel driving voltage ELVDD, low-potential power supply voltage ELVSS, initialization voltage Vinit, reference voltage Vref, or the like is supplied to the pixels 101 through power lines commonly connected to the pixels 101. The constant voltages applied to the pixel circuit may have different voltage levels.

The display panel driver writes the pixel data of the input image to the pixels of the display panel 100 under the control of the timing controller 130.

The display panel driver includes the data driver 110 and the gate driver 120. The display panel driver may further include a de-multiplexer array 112 disposed between the data driver 110 and the data lines 102.

The de-multiplexer array 112 sequentially supplies the data voltages outputted from the channels of the data driver 110 to the data lines 102 using a plurality of de-multiplexers (DEMUX). The de-multiplexer may include multiple switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driver may further include a touch sensor driver for driving the touch sensors. The touch sensor driver is omitted from FIG. 1. The data driver 110 and the touch sensor driver may be integrated into a single drive integrated circuit (IC). In a mobile device or a wearable device, the timing controller 130, the power supply 140, the data driver 110, and the like may be integrated into one drive IC.

The display panel driver may operate in a low speed driving mode under the control of the timing controller 130. The low speed driving mode may be set to reduce power consumption of the display device when the input image does not change by a preset number of frames by analyzing the input image. In the low speed driving mode, the power consumption of the display panel driver and the display panel 100 may be reduced by lowering a refresh rate of pixels when a still image is inputted for a predetermined time or longer. The low speed driving mode is not limited to when a still image is inputted. For example, when the display device operates in the standby mode or when a user command or an input image is not inputted to the display panel driving circuit for a predetermined time or longer, the display panel driving circuit may operate in the low speed driving mode.

The data driver 110 receives pixel data of an input image received as a digital signal from the timing controller 130, and outputs a data voltage. The data driver 110 generates a data voltage Vdata by converting pixel data of an input image into a gamma compensation voltage every frame period using a digital to analog converter (DAC). The gamma reference voltage VGMA is divided into a gamma compensation voltage for each gray scale through a voltage divider circuit. The gamma compensation voltage for each gray level is provided to the DAC of the data driver 110. The data voltage Vdata is outputted from each of the channels of the data driver 110 through an output buffer.

The gate driver 120 may be implemented as a gate in panel (GIP) circuit formed in the circuit layer 12 on the display panel 100 together with the TFT array and wires of the pixel array. The gate driver 120 may be disposed on a bezel BZ, which is non-display region of the display panel 100, or may be distributed in a pixel array in which an input image is reproduced. The gate driver 120 sequentially outputs the gate signal to the gate lines 103 under the control of the timing controller 130. The gate driver 120 may sequentially supply the gate signals to the gate lines 103 while shifting the gate signals using a shift register. The gate signal may include various gate pulses such as a scan pulse, a sensing pulse, an initialization pulse, a light emitting control pulse (hereinafter, referred to as an "EM pulse") and the like.

The gate driver 120 further includes a shift register which outputs a gate signal, and a light emitting control signal generator (hereinafter, referred to as a "generator") 122 which receives a gate signal outputted from the shift register and generates an EM pulse. During a period in which a ripple of the low-potential power supply voltage ELVSS applied to the pixels 100 may be generated, the EM pulse may be generated as a gate-off voltage to block the provision of the electric current to the light emitting element EL, so that the ripple defect of low-potential power supply voltage can be alleviated. The gate signal outputted from the shift register of the gate driver 120 may be applied to a gate line, and the EM pulse outputted from the EM generator 122 may be applied to another gate line.

The timing controller 130 receives digital video data DATA of an input image from the host system, and a timing signal synchronized with the digital video data DATA. The timing signal may include a vertical synchronization signal Vsync, a horizontal synchronization signal Hsync, a clock CLK, a data enable signal DE, and the like. Since the vertical period and the horizontal period can be known by means of counting the data enable signal DE, the vertical synchronization signal Vsync and the horizontal synchronization signal Hsync may be omitted. The data enable signal DE has a period of one horizontal period (1H).

The host system may be any one of a TV (television) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 130 together with the timing signal.

The timing controller 130 may multiply the input frame frequency by i (i is a natural number) in the normal driving mode, so that it can control the operation timing of the display panel driver at a frame frequency of the input frame frequency×i Hz. The input frame frequency is 60 Hz in the NTSC (National Television Standards Committee) scheme, while it is 50 Hz in the PAL (phase-alternating line) scheme.

The timing controller 130 lowers a frequency of a frame rate at which pixel data is written to pixels in the low speed driving mode compared to the normal driving mode. For example, in the normal driving mode, a data refresh frame frequency at which pixel data is written to pixels may occur at a frequency of 60 Hz or higher, for example, at a refresh rate of any one of 60 Hz, 120 Hz, and 144 Hz, and the data refresh frame DRF in the low speed driving mode may occur at a refresh rate of a lower frequency than that of the normal driving mode. For example, the timing controller 130 may lower the driving frequency of the display panel driver by lowering the frame frequency to a frequency between 1 Hz and 30 Hz in order to lower the refresh rate of pixels in the low speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 controls the operation timing of the display panel driver to synchronize the data driver 110, the de-multiplexer array 112, the touch sensor driver, and the gate driver 120.

The gate timing control signal generated from the timing controller 130 may be inputted to the shift register of the gate driver 120 through a level shifter (not shown). The level shifter may receive the gate timing control signal, generate a start pulse and a shift clock, and provide them to the shift register.

Figure 3:
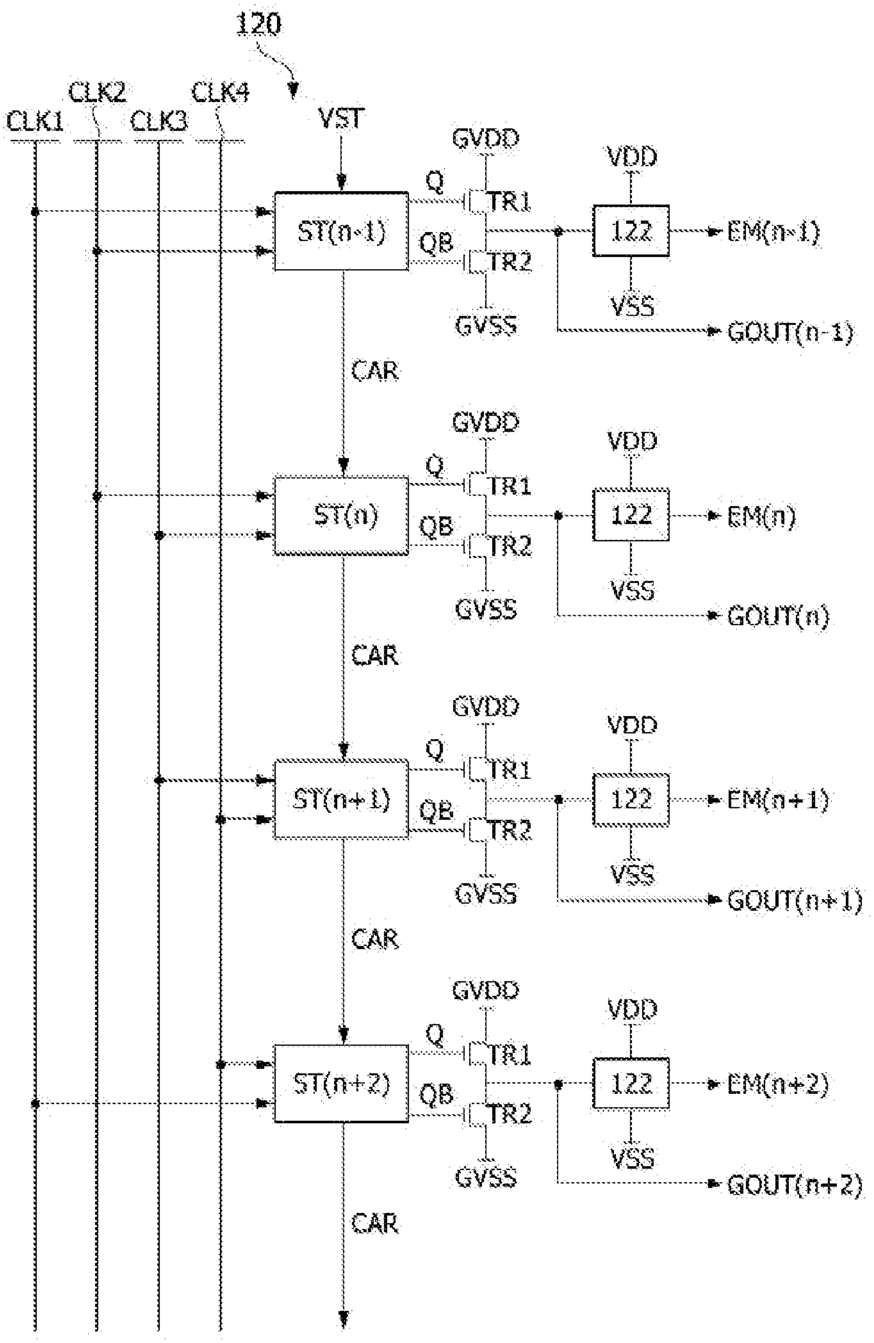
FIG. 3 is a diagram showing a shift register of a gate driver, and an EM generator connected to an output node of the shift register according to an embodiment of this disclosure.
Figure 4:
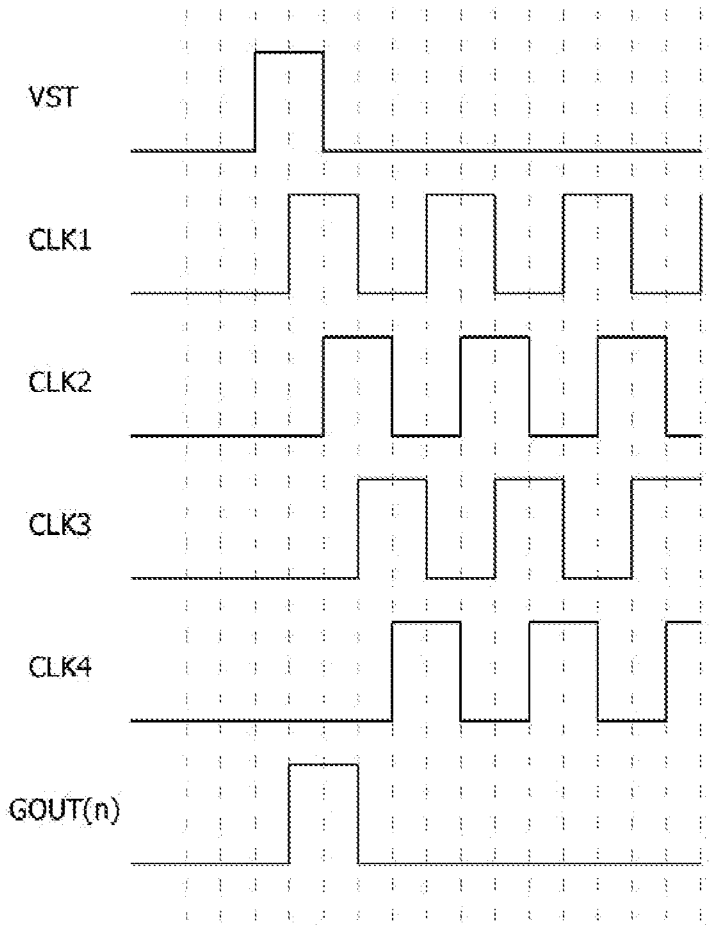
FIG. 4 is a waveform diagram showing input/output signals of the shift register shown in FIG. 3 according to an embodiment of this disclosure.

FIG. 3 is a diagram showing a shift register of a gate driver, and an EM generator connected to an output node of the shift register according to an embodiment of this disclosure. FIG. 4 is a waveform diagram showing input/output signals of the shift register shown in FIG. 3.

Referring to FIGS. 3 and 4, the gate driver 120 includes a shift register that sequentially outputs the gate signals Gout(n−1) to Gout(n+2) in synchronization with the shift clock CLK. The gate signal may include any one of a scan pulse, a sensing pulse, and an initialization pulse. The gate driver 120 may include a plurality of shift registers outputting different gate signals. As shown in FIG. 3, each of the shift registers receives the start signal VST and shift clocks CLK1 to 4, and outputs a gate signal, and shifts the gate signal in synchronization with the shift clock.

The shift register includes signal transfer parts ST(n−1) to ST(n+2) which are dependently connected. Each of the signal transfer parts ST(n−1) to ST(n+2) includes a VST node to which the start signal VST is inputted, a CLK node to which the shift clocks CLK1 to 4 are inputted, and the like.

The start signal VST is generally inputted to the first signal transfer part. In FIG. 3, the n−1th signal transfer part ST(n−1) may be the first signal transfer part receiving the start signal VST. The shift clocks CLK1 to CLK4 may be a four-phase clock as shown in FIG. 4, but for example, the shift clocks may be k-phase (k is a natural number) clock.

The signal transfer parts ST(n) to ST(n+2) dependently connected to the n−1th signal transfer part ST(n−1) receive the carry signal CAR from the previous signal transfer part as the start signal, and start to be driven. The signal transfer parts ST(n−1) to ST(n+2) may output gate signals Gout(n−1) to Gout(n+2) through an output node, respectively, and may simultaneously output the carry signal CAR through another output node.

The buffer BUF includes the first transistor TR1 and the second transistor TR2 connected to the output node from which the gate signal is outputted, and outputs one of the gate signals Gout(n−1) to Gout(n+2) through the output node. The output node is connected to the gate line 103, and is connected to the input node of the EM generator 122.

The first transistor TR1 is a pull-up transistor, and the second transistor TR2 is a pull-down transistor. The first transistor TR1 includes a gate electrode connected to the first control node Q, a first electrode connected to the first power node to which the gate driving voltage GVDD is applied, and a second electrode connected to the output node. The second transistor TR2 is connected to the first transistor TR1 with an output node therebetween. The second transistor TR2 includes a gate electrode connected to the second control node QB, a first electrode connected to the output node, and a second electrode connected to a second power node to which the gate reference voltage GVSS is applied.

The EM generator 122 is connected between the output node of the shift register and the gate line to which the EM pulse is applied. The EM generator 122 may be connected to each of the output nodes of the shift register. The EM generator 122 may receive the gate signals Gout(n−1) to Gout(n+2) outputted from the shift register, and may output EM pulses EM(n−1) to EM(n+2) in response to the gate signals Gout(n−1) to Gout(n+2). The n−1th EM generator 122 outputs the n−1th EM pulse EM(n−1) in response to the n−1th gate signal Gout(n−1). The nth EM generator 122 outputs the nth EM pulse EM(n) in response to the nth gate signal Gout(n). The n+1th EM generator 122 outputs the n+1th EM pulse EM(n+1) in response to the n+1th gate signal Gout(n+1). The gate driving voltage VDD and the gate reference voltage VSS are inputted to each of the EM generators 122. The EM pulses EM(n−1) to EM(n+2) swing between the gate driving voltage VDD and the gate reference voltage VSS.

Since the EM generator 122 does not operate as a shift register, there is no need to receive a start signal and a shift clock.

The gate driving voltages GVDD and VDD applied to the shift register of the gate driver 120 and the EM generator 122 may be set as the gate-on voltage VGH. The gate reference voltages GVSS and VSS may be set as the gate-off voltage VGL.

Due to device characteristic variations and process variations caused in the manufacturing process of the display panel 100, there may be differences in electrical characteristics of driving elements between pixels, and such differences may increase as driving time of the pixels elapses. In order to compensate for variations in electrical characteristics of the driving elements between pixels, an internal compensation circuit may be embedded in the pixel circuit or an external compensation circuit may be connected to the pixel circuit. The internal compensation circuit samples the electrical characteristics of the driving element for each sub-pixel using the internal compensation circuit implemented in each pixel circuit, and compensates for the gate-source voltage Vgs of the driving element by such electrical characteristics. The external compensation circuit compensates for the change in the electrical characteristics of the driving element by generating a compensation value based on a result of sensing the electrical characteristics of the driving element using the external compensation circuit connected to the pixel circuit.

FIGS. 5 to 23 are diagrams showing various pixel circuits and driving signals thereof which can be employed to pixels of this disclosure according to different embodiments.

Figure 5:
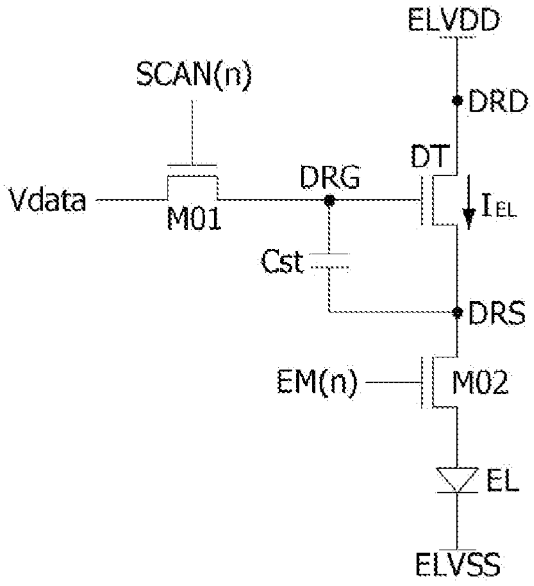
FIG. 5 is a circuit diagram showing a pixel circuit according to a first embodiment of this disclosure.
Figure 6:
FIG. 6 is a waveform diagram showing a gate signal applied to the pixel circuit shown in FIG. 5 according to the first embodiment of this disclosure.
Figure 7:
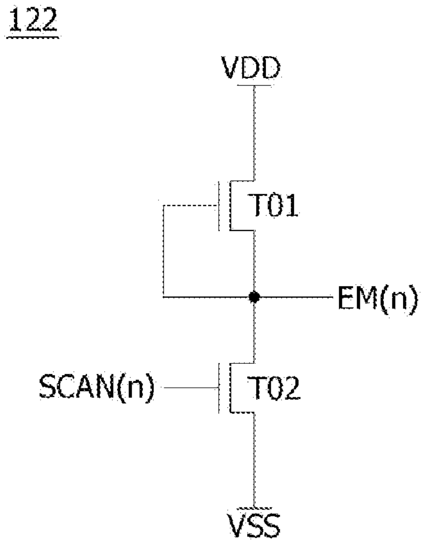
FIG. 7 is a circuit diagram showing the EM generator which generates the EM pulse applied to the pixel circuit shown in FIG. 5 according to the first embodiment of this disclosure.

FIG. 5 is a circuit diagram showing a pixel circuit according to a first embodiment of this disclosure. FIG. 6 is a waveform diagram showing a gate signal applied to the pixel circuit shown in FIG. 5 according to the first embodiment. FIG. 7 is a circuit diagram showing the EM generator 122 which generates the EM pulse EM(n) applied to the pixel circuit shown in FIG. 5 according to the first embodiment. The gate signal includes a scan pulse SCAN(n) and an EM pulse EM(n).

Referring to FIGS. 5 and 6, the pixel circuit includes a light emitting element EL, a driving element DT configured to supply electric current to the light emitting element EL, a first switch element M01 configured to supply the data voltage Vdata to the gate electrode of the driving element DT in response to the scan pulse SCAN(n), a second switch element M02 for blocking an electric current path between the driving element DT and the light emitting element EL in response to the EM pulse EM(n), and a capacitor Cst connected between the second node DRG and the third node DRS. In this pixel circuit, the driving element DT and the switch elements M01 and M02 may be implemented as an n-channel oxide TFT.

A constant voltage, such as a pixel driving voltage ELVDD, a low-potential power supply voltage ELVSS or the like, is applied to this pixel circuit. The pixel driving voltage ELVDD is greater than the low-potential power supply voltage ELVSS. The gate-on voltage VGH may be set to a voltage greater than the pixel driving voltage ELVDD. The gate-off voltage VGL may be set to a voltage less than the low-potential power supply voltage ELVSS.

The gate driver 120 may include a shift register that sequentially outputs the scan pulses SCAN(n). The EM generator 122 may generate an EM pulse EM(n) using a small number of transistors as shown in FIGS. 6 and 7.

The light emitting element EL may be implemented as an OLED including an anode electrode, a cathode electrode, and an organic compound layer connected between these electrodes. The organic compound layer includes, without limitation, a hole injection layer (HIL), a hole transport layer (HTL), an emission layer (EML), an electron transport layer (ETL), and an electron injection layer (EIL). When a voltage is applied to the anode and cathode electrodes, holes passing through the hole transport layer (HTL) and electrons passing through the electron transport layer ETL move to the emission layer (EML) to form excitons, so that visible light may be emitted from the emission layer (EML). The anode electrode of the light emitting element EL may be connected to the second electrode of the second switch element M02, and the cathode electrode thereof may be subjected to the application of the low-potential power supply voltage ELVSS. The OLED used as the light emitting element EL may have a tandem structure in which a plurality of emission layers are stacked. The tandem structure of OLED may improve the luminance and lifespan of the pixels.

The driving element DT generates an electric current $I_{EL}$ for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS to store the gate-source voltage Vgs of the driving element DT.

The scan pulse SCAN(n) swings between the gate-on voltage VGH and the gate-off voltage VGL. The scan pulse SCAN is generated as a gate-on voltage VGH during the data addressing step ADDR. The first switch element M01 is turned on according to the gate-on voltage VGH of the scan pulse SCAN(n) to supply the data voltage Vdata to the second node DRG. The first switch element M01 includes a gate electrode connected to the first gate line to which the scan pulse SCAN(n) is applied, a first electrode connected to the data line to which the data voltage Vdata of the pixel data is applied, and a second electrode connected to the second node DRG.

The EM pulse EM(n) swings between the gate-on voltage VGH and the gate-off voltage VGL. The EM pulse EM(n) is generated as the gate-off voltage VGL during the data addressing step ADDR, and is generated as the gate-on voltage VGH during the light emission step EMIS. The second switch element M02 is turned off according to the gate-off voltage VGL of the EM pulse EM(n) to block the current path between the driving element DT and the light emitting element EL during the data addressing step ADDR. The second switch element M02 is turned on according to the gate-on voltage VGH of the EM pulse EM(n) to form an electric current path between the driving element DT and the light emitting element EL during the light emission step EMIS. In this case, the light emitting element EL may emit light by the electric current $I_{EL}$ from the driving element DT. The second switch element M02 includes a gate electrode connected to a second gate line to which the EM pulse EM(n) is applied, a first electrode connected to the third node DRS, and a second electrode connected to the anode electrode of the light emitting element EL.

When the scan pulse SCAN(n) is inverted to the gate-on voltage VGH, a ripple may be generated in the low-potential power supply voltage ELVSS by capacitor coupling through the parasitic capacitance. The light emitting pulse EM(n) is generated as an anti-phase pulse with respect to the scan pulse SCAN(n), so that the application of the electric current to the light emitting element EL is blocked when a ripple may be generated in the low-potential power supply voltage ELVSS. In this case, since the light emitting element EL cannot emit light, a change in luminance of the light emitting element EL caused by the ripple of the low-potential power supply voltage ELVSS can be prevented.

The EM generator 122 may include the circuit shown in FIG. 7 according to the first embodiment.

Referring to FIG. 7, the EM generator 122 includes a first EM switch element T01 and a second EM switch element T02. The first EM switch element T01 supplies the gate driving voltage VDD to the output node connected to the second gate line. The switch elements T01 and T02 may be implemented as an n-channel oxide TFT.

A gate driving voltage VDD is applied to the first electrode of the first EM switch element T01. The gate driving voltage VDD may be a gate-on voltage VGH. A gate electrode and a second electrode of the first EM switch element T01 are connected to an output node. The second EM switch element T02 is turned on according to the gate-on voltage VGH of the scan pulse SCAN(n) to discharge the voltage of the output node to the gate reference voltage VSS. The gate reference voltage VSS may be a gate-off voltage VGL. The second EM switch element T02 includes a gate electrode to which a scan pulse SCAN(n) is applied, a first electrode connected to an output node, and a second electrode connected to a VSS node to which a gate reference voltage VSS is applied. Accordingly, the EM generator 122 may generate an EM pulse EM(n) in antiphase of the scan pulse SCAN(n) in response to the scan pulse SCAN(n).

In order to drive the pixel circuit shown in FIG. 5, the gate driver 120 includes one shift register for outputting a scan pulse SCAN(n), and an EM generator 122 including two switch elements T01 and T02. The gate driver 120 does not require a separate shift register for outputting and shifting the EM pulse EM(n). Accordingly, since the circuit area occupied by the gate driver circuit is reduced, the bezel BZ of the display panel 100 can be narrowed.

FIGS. 8 to 13 are diagrams showing a pixel circuit connected to an external compensation circuit, and an EM generator generating an EM pulse applied to the pixel circuit. The external compensation circuit includes a REF line RL connected to the pixel circuit, and an analog to digital converter ADC that converts the sensing voltage stored in the REF line RL into digital data. The sensing voltage may include electrical characteristics of the driving element DT, for example, a threshold voltage and/or mobility. An integrator may be connected to the input terminal of the ADC. The timing controller 130 to which the external compensation circuit is employed may generate a compensation value for compensating for changes in the electrical characteristics of the driving element DT according to the sensed data inputted from the ADC, and may compensate for the change in the electrical characteristics of the driving element DT by adding or multiplying the compensation value to the pixel data of the input image. The ADC may be embedded in the data driver 110.

Figure 8:
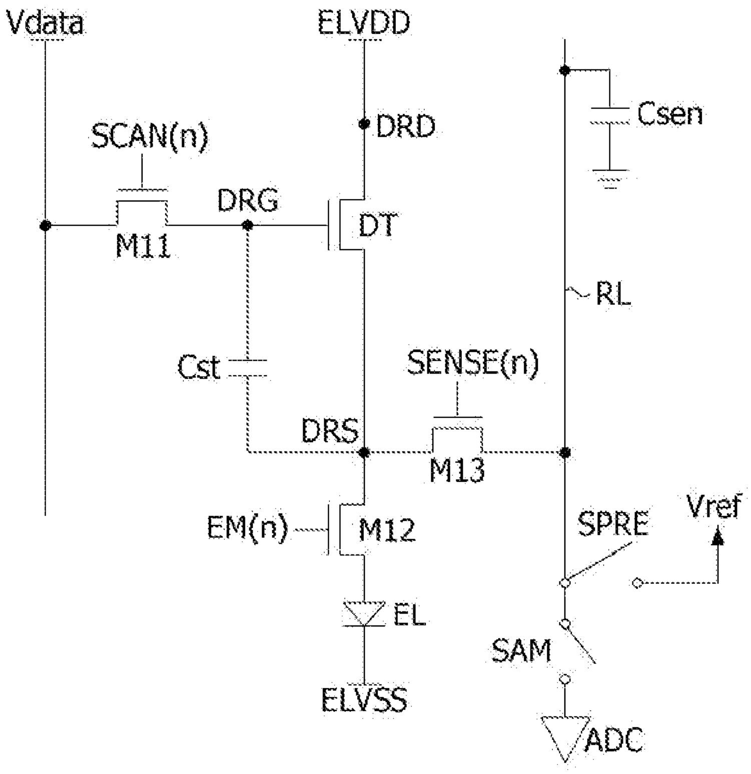
FIG. 8 is a circuit diagram showing a pixel circuit according to a second embodiment of this disclosure.
Figure 9:
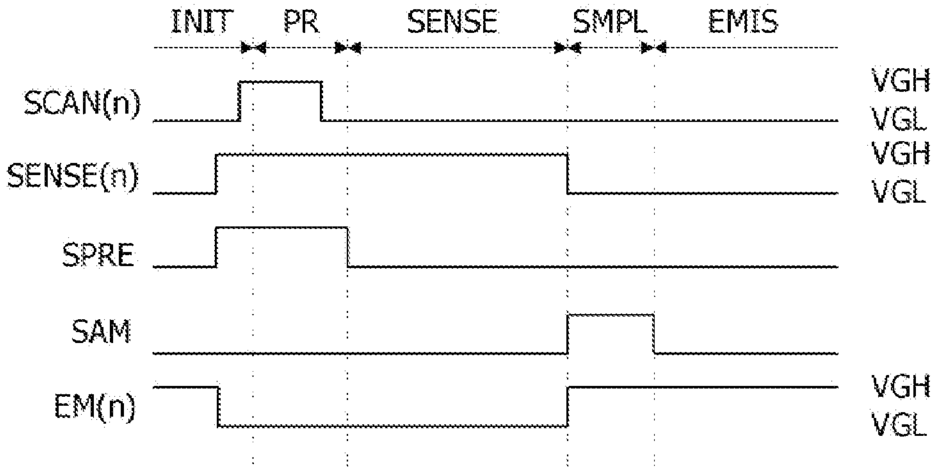
FIG. 9 is a waveform diagram showing a gate signal applied to the pixel circuit shown in FIG. 8 according to the second embodiment of this disclosure.
Figure 10:
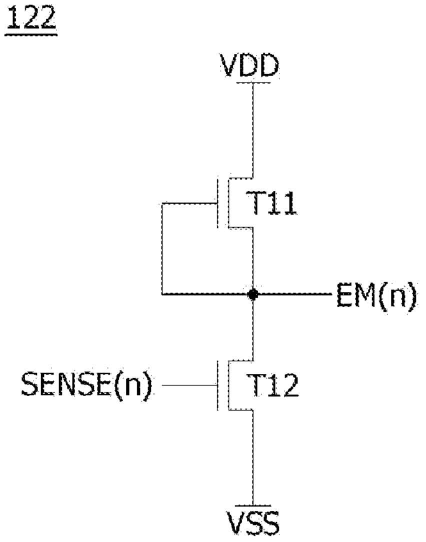
FIG. 10 is a circuit diagram showing the EM generator which generates the EM pulse applied to the pixel circuit shown in FIG. 8 according to the second embodiment of this disclosure.

FIG. 8 is a circuit diagram showing a pixel circuit according to a second embodiment of this disclosure. FIG. 9 is a waveform diagram showing a gate signal applied to the pixel circuit shown in FIG. 8 according to the second embodiment. FIG. 10 is a circuit diagram showing the EM generator 122 which generates the EM pulse EM(n) applied to the pixel circuit shown in FIG. 8 according to the second embodiment. In this embodiment, the gate signal includes a scan pulse SCAN(n), a sensing pulse SENSE(n), and an EM pulse EM(n).

Referring to FIGS. 8 and 9, the pixel circuit includes a light emitting element EL, a driving element DT configured to supply electric current to the light emitting element EL, a first switch element Ml 1 configured to supply the data voltage Vdata to the gate electrode of the driving element DT in response to the scan pulse SCAN(n), a second switch element M12 for blocking an electric current path between the driving element DT and the light emitting element EL in response to the EM pulse EM(n), a third switch element M13 for connecting the third node DRS to the REF line RL in response to the sensing pulse SENSE(n), and a capacitor Cst connected between the second node DRG and the third node DRS. In this pixel circuit, the driving element DT and the switch elements M11, M12 and M13 may be implemented as an n-channel oxide TFT.

A constant voltage, such as a pixel driving voltage ELVDD, a low-potential power supply voltage ELVSS or the like, is applied to this pixel circuit. The pixel driving voltage ELVDD is greater than the low-potential power supply voltage ELVSS. The gate-on voltage VGH may be set to a voltage greater than the pixel driving voltage ELVDD. The gate-off voltage VGL may be set to a voltage less than the low-potential power supply voltage ELVSS. The reference voltage Vref may be set to a low-potential voltage close to the low-potential power supply voltage ELVSS.

The driving period of the pixel circuit may be divided into an initialization step INIT, a programming step PR, a sensing step SENSE, a sampling step SMPL, and a light emission step EMIS.

The scan pulse SCAN(n) is synchronized with the data voltage Vdata of the pixel data, and is generated as the gate-on voltage VGH in the programming step PR. The scan pulse SCAN(n) may rise to the gate-on voltage VGH at a timing close to the end time of the initialization step INIT. The scan pulse SCAN(n) is a gate-off voltage VGL in the sensing step SENSE, the sampling step SMPL, and the light emission step EMIS. The sensing pulse SENSE(n) rises to the gate-on voltage VGH in the initialization step INIT, and maintains the gate-on voltage VGH during the programming step PR and the sensing step SENSE. The sensing pulse SENSE(n) is the gate-off voltage VGL in the sampling step SMPL and the light emission step EMIS.

The EM pulse EM(n) is generated in antiphase of the sensing pulse SENSE(n). Accordingly, the EM pulse EM(n) is inverted to the gate-off voltage VGL in the initialization step INIT to maintain the gate-off voltage VGL during the programming step PR and the sensing step SENSE. The EM pulse EM(n) is the gate-on voltage VGH in the sampling step SMPL and the light emission step EMIS.

The reference voltage switch element SPRE and the sampling switch element SAM may be connected to the REF line RL to which the reference voltage Vref is applied. The reference voltage switch element SPRE and the sampling switch element SAM are turned on under the control of the timing controller 130. The reference voltage switch element SPRE is turned on in the initialization step INIT and the programming step PR to supply the reference voltage Vref to the REF line RL. The sampling switch element SAM is turned on in the sampling step SMPL to connect the REF line RL to the ADC.

The light emitting element EL may be implemented as an OLED including an anode electrode, a cathode electrode, and an organic compound layer connected between these electrodes. The anode electrode of the light emitting element EL may be connected to the second electrode of the second switch element M12, and the cathode electrode thereof may be subjected to the application of the low-potential power supply voltage ELVSS.

The driving element DT generates an electric current for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS.

The first switch element M11 is turned on according to the gate-on voltage VGH of the scan pulse SCAN(n) to supply the data voltage Vdata to the second node DRG in the programming step PR. The first switch element M11 includes a gate electrode connected to the first gate line to which the scan pulse SCAN(n) is applied, a first electrode connected to the data line to which the data voltage Vdata is applied, and a second electrode connected to the second node DRG.

The second switch element M12 is turned off according to the gate-off voltage VGL of the EM pulse EM(n) to block an electric current path between the driving element DT and the light emitting element EL during the initialization step INIT, the programming step PR, and the sensing step SENSE. The second switch element M12 is turned on according to the gate-on voltage VGH of the EM pulse EM(n) to form an electric current path between the driving element DT and the light emitting element EL during the light emission step EMIS. The second switch element M12 includes a gate electrode connected to a second gate line to which the EM pulse EM(n) is applied, a first electrode connected to the third node DRS, and a second electrode connected to the anode electrode of the light emitting element EL.

The third switch element M13 is turned on according to the gate-on voltage VGH of the sensing pulse SENSE(n) to connect the third node DRS to the REF line RL to which the reference voltage Vref is applied during the programming step PR and the sensing step SENSE. In the sensing step SENSE, the voltage of the third node DRS is stored in the capacitor Csen of the REF line RL, so that the electrical characteristics of the driving element DT are stored in the REF line RL, and the voltage of the REF line RL is converted to digital data through the ADC in the sampling step SMPL. The third switch element M13 includes a gate electrode connected to the third gate line to which the sensing pulse SENSE(n) is applied, a first electrode connected to the third node DRS, and a second electrode connected to the REF line RL.

When the sensing pulse SENSE(n) is inverted to the gate-on voltage VGH, a ripple may be generated in the low-potential power supply voltage ELVSS by capacitor coupling through the parasitic capacitance. The light emitting pulse EM(n) is generated as an anti-phase pulse with respect to the sensing pulse SENSE(n), so that the application of the electric current to the light emitting element EL is blocked when a ripple may be generated in the low-potential power supply voltage ELVSS. In this case, since the light emitting element EL cannot emit light, a change in luminance of the light emitting element EL caused by the ripple of the low-potential power supply voltage ELVSS can be prevented.

The EM generator 122 may include the circuit shown in FIG. 10 according to the second embodiment.

Referring to FIG. 10, the EM generator 122 includes a first EM switch element T11 and a second EM switch element T12. The switch elements T11 and T12 may be implemented as an n-channel oxide TFT.

The first EM switch element T11 supplies the gate driving voltage VDD to the output node connected to the second gate line. A gate driving voltage VDD is applied to the first electrode of the first EM switch element T11. The gate driving voltage VDD may be a gate-on voltage VGH. A gate electrode and a second electrode of the first EM switch element T11 are connected to an output node. The second EM switch element T12 is turned on according to the gate-on voltage VGH of the sensing pulse SENSE(n) to discharge the voltage of the output node to the gate reference voltage VSS. The gate reference voltage VSS may be a gate-off voltage VGL. The second EM switch element T12 includes a gate electrode to which the sensing pulse SENSE (n) is applied, a first electrode connected to the output node, and a second electrode connected to the VSS node. Accordingly, the EM generator 122 may generate an EM pulse EM(n) in antiphase of the sensing pulse SENSE(n) in response to the sensing pulse SENSE(n).

In order to drive the pixel circuit shown in FIG. 8, the gate driver 120 may include a first shift register which sequentially outputs a scan pulse SCAN(n) and a second shift register which sequentially outputs a sensing pulse SENSE (n). The EM generator 122 may generate an EM pulse EM(n) using a small number of transistors as shown in FIGS. 9 and 10. The gate driver 120 does not require a separate shift register for outputting and shifting the EM pulse EM(n). Accordingly, since the circuit area occupied by the gate driver circuit is reduced, the bezel BZ of the display panel 100 can be narrowed.

Figure 11:
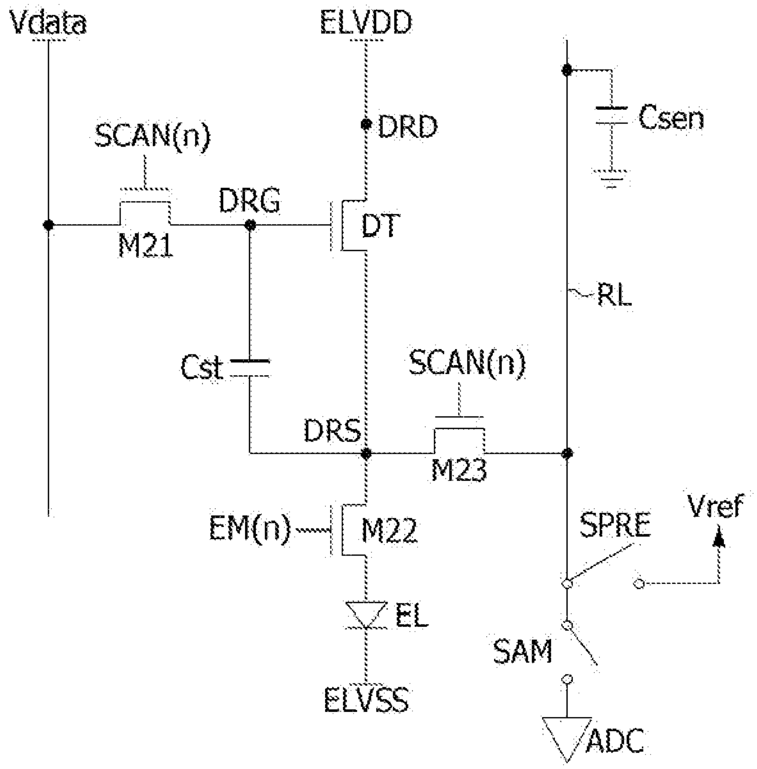
FIG. 11 is a circuit diagram showing a pixel circuit according to a third embodiment of this disclosure.
Figure 12:
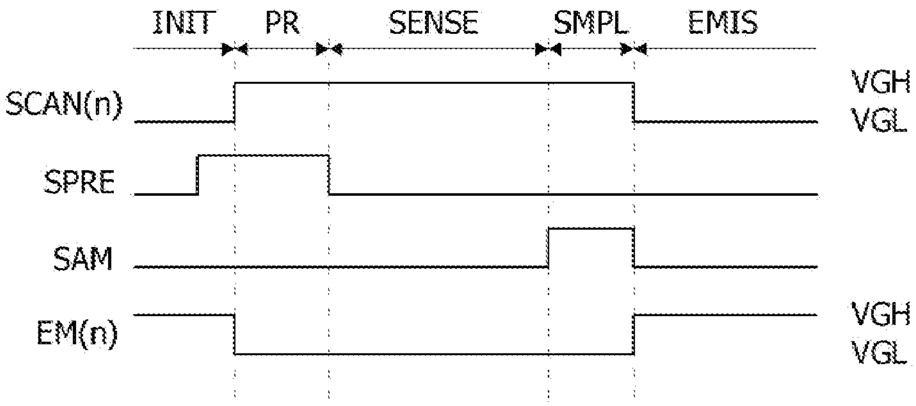
FIG. 12 is a waveform diagram showing a gate signal applied to the pixel circuit shown in FIG. 11 according to the third embodiment of this disclosure.
Figure 13:
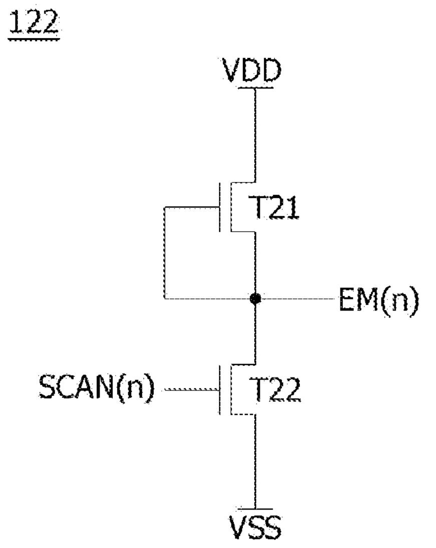
FIG. 13 is a circuit diagram showing the EM generator which generates the EM pulse applied to the pixel circuit shown in FIG. 11 according to a third embodiment of this disclosure.

FIG. 11 is a circuit diagram showing a pixel circuit according to a third embodiment of this disclosure. FIG. 12 is a waveform diagram showing a gate signal applied to the pixel circuit shown in FIG. 11 according to the third embodiment. FIG. 13 is a circuit diagram showing the EM generator 122 which generates the EM pulse EM(n) applied to the pixel circuit shown in FIG. 11 according to the third embodiment. In this embodiment, the gate signal includes a scan pulse SCAN(n) and an EM pulse EM(n). The pixel circuit according to the third embodiment of this disclosure is substantially the same as the pixel circuit of the second embodiment except that the second and third switch elements M21, M23 are simultaneously turned on/off in response to the scan pulse SCAN(n). In the pixel circuit according to the third embodiment of this disclosure, a detailed description of the parts substantially identical to those of the above-described second embodiment will be omitted.

Referring to FIGS. 11 and 12, the pixel circuit includes a light emitting element EL, a driving element DT configured to supply electric current to the light emitting element EL, a first switch element M21 configured to supply the data voltage Vdata to the gate electrode of the driving element DT in response to the scan pulse SCAN(n), a second switch element M22 for blocking an electric current path between the driving element DT and the light emitting element EL in response to the EM pulse EM(n), a third switch element M23 for connecting the third node DRS to the REF line RL in response to the scan pulse SCAN(n), and a capacitor Cst connected between the second node DRG and the third node DRS. In this pixel circuit, the driving element DT and the switch elements M21, M22 and M23 may be implemented as an n-channel oxide TFT.

The scan pulse SCAN(n) is generated as the gate-on voltage VGH in the programming step PR, the sensing step SENSE, and the sampling step SMPL. The scan pulse SCAN(n) is the gate-off voltage VGL in the initialization step INIT and the light emission step EMIS. The EM pulse EM(n) is generated in antiphase of the scan pulse SCAN(n).

Accordingly, the EM pulse EM(n) is generated as the gate-off voltage VGL in the programming step PR, the sensing step SENSE, and the sampling step SMPL. The EM pulse EM(n) is the gate-on voltage VGH in the initialization step INIT and the light emission step EMIS.

The reference voltage switch element SPRE is turned on in the initialization step INIT and the programming step PR to supply the reference voltage Vref to the REF line RL. The sampling switch element SAM is turned on in the sampling step SMPL to connect the REF line RL to the ADC.

The first switch element M21 is turned on according to the gate-on voltage VGH of the scan pulse SCAN(n) to connect the second node DRG to the data line to which the data voltage Vdata is applied during the programming step PR, the sensing step SENSE, and the sampling step SMPL. The first switch element M21 includes a gate electrode connected to the first gate line to which the scan pulse SCAN(n) is applied, a first electrode connected to the data line to which the data voltage Vdata is applied, and a second electrode connected to the second node DRG.

The second switch element M22 is turned off according to the gate-off voltage VGL of the EM pulse EM(n) to block an electric current path between the driving element DT and the light emitting element EL during the programming step PR, the sensing step SENSE, and the sampling step SMPL. The second switch element M22 is turned on according to the gate-on voltage VGH of the EM pulse EM(n) to form an electric current path between the driving element DT and the light emitting element EL during the light emission step EMIS. The second switch element M22 includes a gate electrode connected to a second gate line to which the EM pulse EM(n) is applied, a first electrode connected to the third node DRS, and a second electrode connected to the anode electrode of the light emitting element EL.

The third switch element M23 is turned on according to the gate-on voltage VGH of the scan pulse SCAN(n) to connect the third node DRS to the REF line RL to which the reference voltage Vref is applied during the programming step PR, the sensing step SENSE, and the sampling step SMPL. The third switch element M23 includes a gate electrode connected to the first gate line to which the scan pulse SCAN(n) is applied, a first electrode connected to the third node DRS, and a second electrode connected to the REF line RL.

When the scan pulse SCAN(n) is inverted to the gate-on voltage VGH, a ripple may be generated in the low-potential power supply voltage ELVSS. The light emitting pulse EM(n) is generated as an anti-phase pulse with respect to the scan pulse SCAN(n), so that the application of the electric current to the light emitting element EL is blocked when a ripple may be generated in the low-potential power supply voltage ELVSS.

The EM generator 122 may include the circuit shown in FIG. 13 according to the third embodiment.

Referring to FIG. 13, the EM generator 122 includes a first EM switch element T21 and a second EM switch element T22. The switch elements T21 and T22 may be implemented as an n-channel oxide TFT.

The first EM switch element T21 supplies the gate driving voltage VDD to the output node connected to the second gate line. A gate driving voltage VDD is applied to the first electrode of the first EM switch element T21. The gate driving voltage VDD may be a gate-on voltage VGH. A gate electrode and a second electrode of the first EM switch element T21 are connected to an output node. The second EM switch element T22 is turned on according to the gate-on voltage VGH of the scan pulse SCAN(n) to discharge the voltage of the output node to the gate reference voltage VSS. The gate reference voltage VSS may be a gate-off voltage VGL. Accordingly, the EM generator 122 may generate an EM pulse EM(n) in antiphase of the scan pulse SCAN(n) in response to the scan pulse SCAN(n).

In order to drive the pixel circuit shown in FIG. 11, the gate driver 120 may include a shift register which sequentially outputs scan pulses SCAN(n), and an EM generator 122 including a small number of transistors as shown in FIG. 13. The EM generator 122 may generate an EM pulse EM(n) using a small number of transistors as shown in FIGS. 12 and 13. The gate driver 120 does not require a separate shift register for outputting and shifting the EM pulse EM(n). Accordingly, since the circuit area occupied by the gate driving circuit is reduced, the bezel BZ of the display panel 100 can be narrowed.

Figure 14:
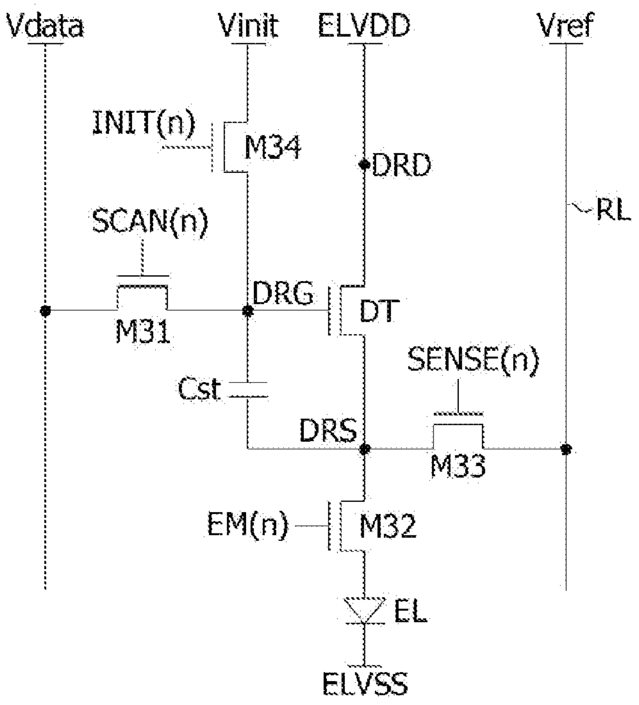
FIG. 14 is a circuit diagram showing a pixel circuit according to a fourth embodiment of this disclosure.
Figure 15:
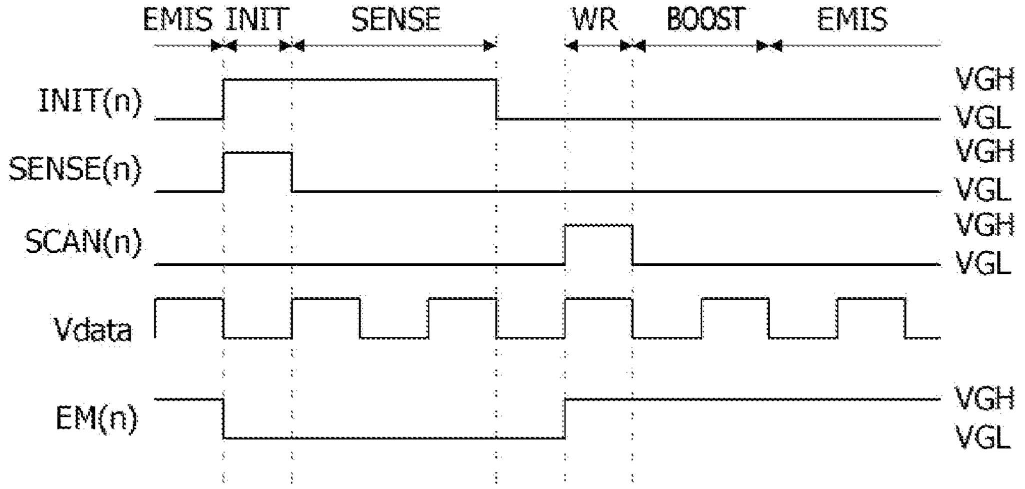
FIG. 15 is a waveform diagram showing a gate signal applied to the pixel circuit shown in FIG. 14 according to the fourth embodiment of this disclosure.
Figure 16:
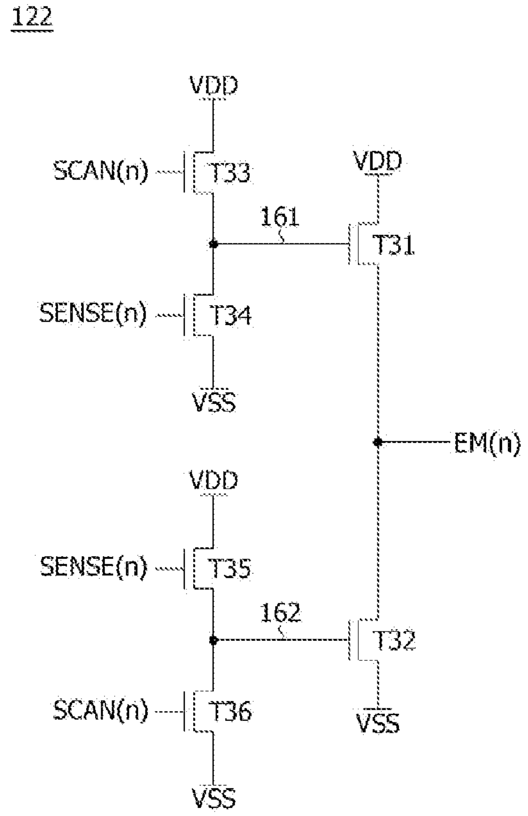
FIG. 16 is a circuit diagram showing the EM generator which generates the EM pulse applied to the pixel circuit shown in FIG. 14 according to the fourth embodiment of this disclosure.

FIGS. 14 to 16 are diagrams showing a pixel circuit including an internal compensation circuit, and a driving signal thereof. FIG. 14 is a circuit diagram showing a pixel circuit according to a fourth embodiment of this disclosure. FIG. 15 is a waveform diagram showing a gate signal applied to the pixel circuit shown in FIG. 14 according to the fourth embodiment. FIG. 16 is a circuit diagram showing the EM generator 122 which generates the EM pulse EM(n) applied to the pixel circuit shown in FIG. 14 according to the fourth embodiment. In this embodiment, the gate signal includes an initialization pulse INIT(n), a scan pulse SCAN (n), a sensing pulse SENSE(n), and an EM pulse EM(n).

Referring to FIGS. 14 and 15, the pixel circuit includes a light emitting element EL, a driving element DT configured to supply electric current to the light emitting element EL, a first switch element M31 configured to supply the data voltage Vdata to the gate electrode of the driving element DT in response to the scan pulse SCAN(n), a second switch element M32 for blocking an electric current path between the driving element DT and the light emitting element EL in response to the EM pulse EM(n), a third switch element M33 for connecting the third node DRS to the REF line RL in response to the sensing pulse SENSE(n), a fourth switch element M34 configured to supply the initialization voltage Vinit to the second node DRG in response to the initialization pulse INIT(n), and a capacitor Cst connected between the second node DRG and the third node DRS. In this pixel circuit, the driving element DT and the switch elements M31 to M34 may be implemented as an n-channel oxide TFT.

A constant voltage, such as a pixel driving voltage ELVDD, a low-potential power supply voltage ELVSS, a reference voltage Vref, an initialization voltage Vinit, or the like, is applied to this pixel circuit. The pixel driving voltage ELVDD is greater than the low-potential power supply voltage ELVSS. The gate-on voltage VGH may be set to a voltage greater than the pixel driving voltage ELVDD. The gate-off voltage VGL may be set to a voltage less than the low-potential power supply voltage ELVSS. The reference voltage Vref may be set to a low-potential voltage close to the low-potential power supply voltage ELVSS. The initialization voltage Vinit may be set to a voltage at which the driving element DT may be turned on.

The driving period of the pixel circuit may be divided into an initialization step INIT, a sensing step SENSE, an addressing step WR, a boosting step BOOST, and a light emission step EMIS. In the initialization step INIT, the driving element DT is turned on. In the sensing step SENSE, when the voltage of the third node DRS rises and the gate-source voltage Vgs of the driving element DT becomes less than the threshold voltage Vth, the driving element DT is turned off. When the driving element DT is turned off in the sensing step SENSE, the threshold voltage Vth of the driving element DT is sampled to the capacitor Cst. When the data voltage Vdata is applied to the second node DRG in the addressing step WR, the data voltage Vdata compensated by the threshold voltage Vth is applied as the gate voltage of the driving element DT. After the voltages of the floating second node DRG and third node DRS rise in the boosting step BOOST, an electric current for driving the light emitting element EL is generated from the driving element DT according to the gate-source voltage Vgs compensated by the threshold voltage Vth of the driving element DT.

The initialization pulse INIT(n) is generated as the gate-on voltage VGH in the initialization step INIT and the sensing step SENSE. The initialization pulse INIT(n) is the gate-off voltage VGL in the addressing step WR, the boosting step BOOST, and the light emission step EMIS. The scan pulse SCAN(n) is synchronized with the data voltage Vdata of the pixel data, and is generated as the gate-on voltage VGH in the addressing step WR. The scan pulse SCAN(n) is the gate-off voltage VGL in the initialization step INIT, the sensing step SENSE, the boosting step BOOST, and the light emission step EMIS. The sensing pulse SENSE(n) is generated as the gate-on voltage VGH in the initialization step INIT. The sensing pulse SENSE(n) is the gate-off voltage VGL in the sensing step SENSE, the addressing step WR, the boosting step BOOST, and the light emission step EMIS.

The EM pulse EM(n) is inverted to the gate-off voltage VGL when the sensing pulse SENSE(n) is inverted to the gate-on voltage VGH, while it is inverted to the gate-on voltage VGH when the scan pulse SCAN(n) is inverted to the gate-on voltage VGH. Accordingly, the EM pulse EM(n) is generated as the gate-off voltage VGL in the initialization step INIT and the sensing step SENSE. The EM pulse EM(n) is the gate-on voltage VGH in the addressing step WR, the boosting step BOOST, and the light emission step EMIS.

The light emitting element EL may be implemented as an OLED including an anode electrode, a cathode electrode, and an organic compound layer connected between these electrodes. The anode electrode of the light emitting element EL may be connected to the second electrode of the second switch element M32, and the cathode electrode thereof may be subjected to the application of the low-potential power supply voltage ELVSS.

The driving element DT generates an electric current for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS.

The first switch element M31 is turned on according to the gate-on voltage VGH of the scan pulse SCAN(n) to supply the data voltage Vdata to the second node DRG in the addressing step WR. The first switch element M31 includes a gate electrode connected to the first gate line to which the scan pulse SCAN(n) is applied, a first electrode connected to the data line to which the data voltage Vdata is applied, and a second electrode connected to the second node DRG.

The second switch element M32 is turned off according to the gate-off voltage VGL of the EM pulse EM(n) to block an electric current path between the driving element DT and the light emitting element EL during the initialization step INIT and the sensing step SENSE. The second switch element M32 is turned on according to the gate-on voltage VGH of the EM pulse EM(n) to form an electric current path between the driving element DT and the light emitting element EL during the addressing step WR, the boosting step BOOST, and the light emission step EMIS. The second switch element M32 includes a gate electrode connected to a second gate line to which the EM pulse EM(n) is applied, a first electrode connected to the third node DRS, and a second electrode connected to the anode electrode of the light emitting element EL.

The third switch element M33 is turned on according to the gate-on voltage VGH of the sensing pulse SENSE(n) to connect the third node DRS to the REF line RL to which the reference voltage Vref is applied in the initialization step INIT. The third switch element M33 includes a gate electrode connected to the third gate line to which the sensing pulse SENSE(n) is applied, a first electrode connected to the third node DRS, and a second electrode connected to the REF line RL.

The fourth switch element M34 is turned on according to the gate-on voltage VGH of the initialization pulse INIT(n) to supply the initialization voltage Vinit to the second node DRG in the initialization step INIT and the sensing step SENSE. The fourth switch element M34 includes a gate electrode connected to the fourth gate line to which the initialization pulse INIT(n) is applied, a first electrode connected to the INI line to which the initialization voltage Vinit is applied, and a second electrode connected to the second node DRG.

The EM generator 122 may include the circuit shown in FIG. 16 according to the fourth embodiment.

Referring to FIG. 16, the EM generator 122 includes first to sixth switch elements T31 to T36. The switch elements T31 and T36 may be implemented as an n-channel oxide TFT.

When the voltage of the pull-up control node 161 is charged to the gate-on voltage, the first EM switch element T31 is turned on to supply the gate driving voltage VDD to the output node connected to the second gate line. At this time, the voltage of the EM pulse EM(n) is increased to the gate-on voltage VGH. The gate driving voltage VDD is applied to the first electrode of the first EM switch element T31. The gate driving voltage VDD may be a gate-on voltage VGH. The first EM switch element T31 includes a gate electrode connected to the pull-up control node 161, a first electrode to which the gate driving voltage VDD is applied, and a second electrode connected to the output node.

When the pull-down control node 162 is charged to the gate-on voltage, the second EM switch element T32 is turned on to connect the output node to the VSS node to which the gate reference voltage VSS is applied, and to discharge the output node. The gate reference voltage VSS may be a gate-off voltage VGL. When the second EM switch element T32 is turned on, the voltage of the EM pulse EM(n) is lowered to the gate-off voltage VGL. The second EM switch element T32 includes a gate electrode connected to the pull-down control node 162, a first electrode connected to the output node, and a second electrode connected to the VSS node.

The third EM switch element T33 is turned on according to the gate-on voltage VGH of the scan pulse SCAN(n) to charge the pull-up control node 161. The fourth EM switch element T34 is turned on according to the gate-on voltage VGH of the sensing pulse SENSE(n) to discharge the pull-up control node 161. When the third EM switch element T33 is turned on and the fourth EM switch element T34 is turned off, the first EM switch element T31 is turned on. When the third EM switch element T33 is turned off, and the fourth EM switch element T34 is turned on, the pull-up control node 161 is discharged to turn off the first EM switch element T31. When all of the third and fourth EM switch elements T33 and T34 are turned off, the pull-up control node 161 floats to maintain the previous state.

The third EM switch element T33 includes a gate electrode to which the scan pulse SCAN(n) is applied, a first electrode to which the gate driving voltage VDD is applied, and a second electrode connected to the pull-up control node 161. The fourth EM switch element T34 includes a gate electrode to which the sensing pulse SENSE(n) is applied, a first electrode connected to the pull-up control node 161, and a second electrode connected to the VSS node.

The fifth EM switch element T35 is turned on according to the gate-on voltage VGH of the sensing pulse SENSE(n) to charge the pull-down control node 162. The sixth EM switch element T36 is turned on according to the gate-on voltage VGH of the scan pulse SCAN(n) to discharge the pull-down control node 162. When the fifth EM switch element T35 is turned on and the sixth EM switch element T36 is turned off, the second EM switch element T32 is turned on. When the fifth EM switch element T35 is turned off and the sixth EM switch element T36 is turned on, the pull-down control node 162 is discharged to turn off the second EM switch element T32. When all of the fifth and sixth EM switch elements T35 and T36 are turned off, the pull-down control node 162 floats to maintain the previous state.

The fifth EM switch element T35 includes a gate electrode to which a sensing pulse SENSE(n) is applied, a first electrode to which a gate driving voltage VDD is applied, and a second electrode connected to the pull-down control node 162. The sixth EM switch element T36 includes a gate electrode to which the scan pulse SCAN(n) is applied, a first electrode connected to the pull-down control node 162, and a second electrode connected to the VSS node.

In order to drive the pixel circuit shown in FIG. 14, the gate driver 120 includes a first shift register which sequentially outputs an initialization pulse INIT(n), a second shift register which sequentially outputs a scan pulse SCAN(n), and a third shift register which sequentially outputs sensing pulse SENSE(n). The EM generator 122 may generate an EM pulse EM(n) using a small number of transistors T31 to T36 as shown in FIGS. 15 and 16. The gate driver 120 does not require a separate shift register for outputting and shifting the EM pulse EM(n). Accordingly, since the circuit area occupied by the gate driving circuit is reduced, the bezel BZ of the display panel 100 can be narrowed.

Figure 17:
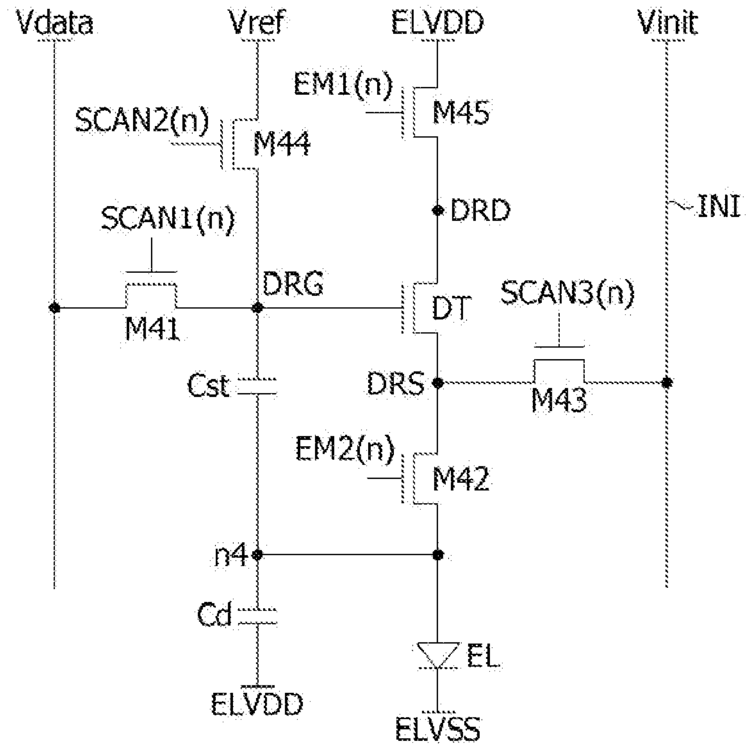
FIG. 17 is a circuit diagram showing a pixel circuit according to a fifth embodiment of this disclosure.
Figure 18:
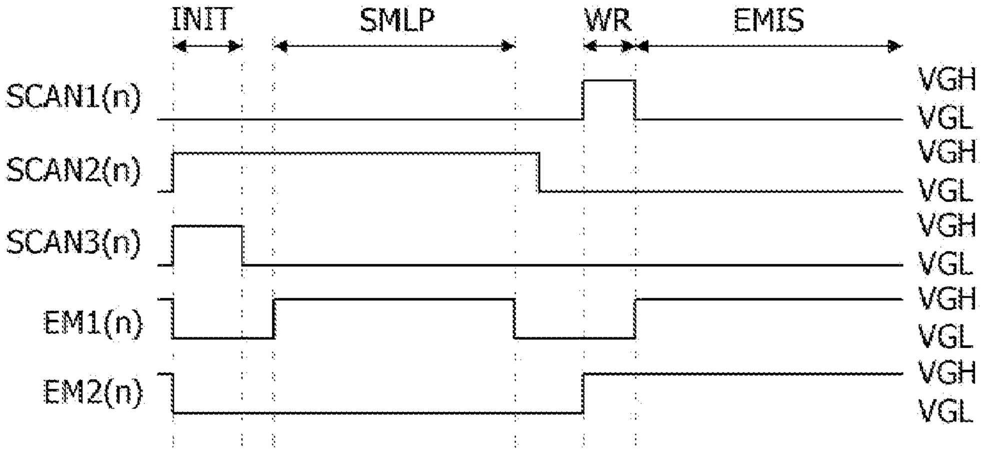
FIG. 18 is a waveform diagram showing a gate signal applied to the pixel circuit shown in FIG. 17 according to the fifth embodiment of this disclosure.
Figure 19:
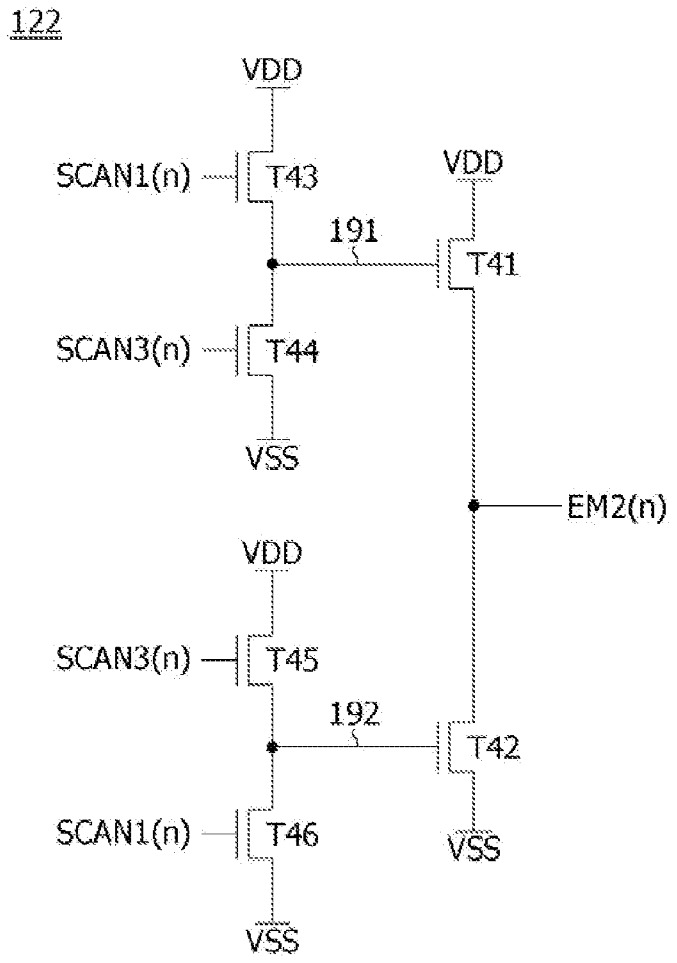
FIG. 19 is a circuit diagram showing an EM generator which generates a second EM pulse applied to the pixel circuit shown in FIG. 17 according to the fifth embodiment of this disclosure.

FIG. 17 is a circuit diagram showing a pixel circuit according to a fifth embodiment of this disclosure. FIG. 18 is a waveform diagram showing a gate signal applied to the pixel circuit shown in FIG. 17 according to the fifth embodiment. FIG. 19 is a circuit diagram showing the EM generator 122 which generates the second EM pulse EM2(*n*) applied to the pixel circuit shown in FIG. 17 according to the fifth embodiment. In this embodiment, the gate signal includes a first scan pulse SCAN1(*n*), a second scan pulse SCAN2(*n*), a third scan pulse SCAN3(*n*), a first EM pulse EM1(*n*), and a second EM pulse EM2(*n*).

Referring to FIGS. 17 and 18, the pixel circuit includes a light emitting element EL, a driving element DT configured to supply electric current to the light emitting element EL, a first switch element M41 configured to supply a data voltage Vdata to the gate electrode of the driving element DT in response to the first scan pulse SCAN1(*n*), a second switch element M42 for blocking an electric current path between the driving element DT and the light emitting element EL in response to the second EM pulse EM2(*n*), a third switch element M43 for connecting the third node DRS to the initialization line INI in response to the third scan pulse SCAN3(*n*), a fourth switch element M44 configured to supply the reference voltage Vref to the second node DRG in response to the second scan pulse SCAN2(*n*), a fifth switch element M45 configured to supply the pixel driving voltage ELVDD to the first node DRD in response to the first EM pulse EM1(*n*), a first capacitor Cst connected between the second node DRG and the fourth node n4, and a second capacitor Cd connected between the fourth node and the VDD node. The VDD node is connected to the VDD line to which the pixel driving voltage ELVDD is applied.

In this pixel circuit, the driving element DT and the switch elements M31 to M34 may be implemented as an n-channel oxide TFT.

A constant voltage, such as a pixel driving voltage ELVDD, a low-potential power supply voltage ELVSS, a reference voltage Vref, an initialization voltage Vinit, or the like, is applied to this pixel circuit. The pixel driving voltage ELVDD is greater than the low-potential power supply voltage ELVSS. The gate-on voltage VGH may be set to a voltage greater than the pixel driving voltage ELVDD. The gate-off voltage VGL may be set to a voltage less than the low-potential power supply voltage ELVSS. The initialization voltage Vinit may be set to a low-potential voltage close to the low-potential power supply voltage ELVSS. The reference voltage Vref may be set to a voltage at which the driving element DT may be turned on.

The driving period of this pixel circuit may be divided into an initialization step INIT, a sampling step SMPL, an addressing step WR, and a light emission step EMIS.

The first scan pulse SCAN1(*n*) is synchronized with the data voltage Vdata of the pixel data, and is generated as the gate-on voltage VGH in the addressing step WR. The first scan pulse SCAN1(*n*) is a gate-off voltage VGL in the initialization step INIT, the sampling step SMPL, and the light emission step EMIS. The second scan pulse SCAN2(*n*) is generated as the gate-on voltage VGH in the initialization step INIT and the sampling step SMPL. The second scan pulse SCAN2(*n*) is the gate-off voltage VGL in the addressing step WR and the light emission step EMIS. The third scan pulse SCAN3(*n*) is generated as the gate-on voltage VGH in the initialization step INIT. The third scan pulse SCAN3(*n*) is the gate-off voltage VGL in the sampling step SMPL, the addressing step WR, and the light emission step EMIS.

The first EM pulse EM1(*n*) is generated as the gate-off voltage VGL in the initialization step INIT and the addressing step WR. The first EM pulse EM1(*n*) is the gate-on voltage VGH for the sampling step SMPL and the light emission step EMIS.

The second EM pulse EM2(*n*) is inverted to the gate-off voltage VGL when the third scan pulse SCAN3(*n*) is inverted to the gate-on voltage VGH, while it is inverted to the gate-on voltage VGH when the first scan pulse SCAN1 (*n*) is inverted to the gate-on voltage VGH. Accordingly, the second EM pulse EM2(*n*) is generated as the gate-off voltage VGL in the initialization step INIT and the sampling step SMPL. The second EM pulse EM2(*n*) is the gate-on voltage VGH in the addressing step WR and the light emission step EMIS.

The light emitting element EL may be implemented as an OLED including an anode electrode, a cathode electrode, and an organic compound layer connected between these electrodes. The anode electrode of the light emitting element EL may be connected to the fourth node n4, and the cathode electrode thereof may be subjected to the application of the low-potential power supply voltage ELVSS.

The driving element DT generates an electric current for driving the light emitting element EL according to the gate-source voltage Vgs. The driving element DT includes a gate electrode connected to the second node DRG, a first electrode connected to the first node DRD, and a second electrode connected to the third node DRS.

The first capacitor Cst is connected between the second node DRG and the fourth node n4. The second capacitor Cd is connected between the fourth node n4 and the VDD node.

The first switch element M41 is turned on according to the gate-on voltage VGH of the first scan pulse SCAN1(*n*) to supply the data voltage Vdata to the second node DRG in the addressing step WR. The first switch element M41 includes a gate electrode connected to the first gate line to which the first scan pulse SCAN1(*n*) is applied, a first electrode connected to the data line to which the data voltage Vdata is applied, and a second electrode connected to the second node DRG.

The second switch element M42 is turned off according to the gate-off voltage VGL of the second EM pulse EM2(*n*) to block an electric current path between the driving element DT and the light emitting element EL during the initialization step INIT and the sampling step SMPL. The second switch element M42 is turned on according to the gate-on voltage VGH of the second EM pulse EM2(*n*) to form an electric current path between the driving element DT and the light emitting element EL during the addressing step WR and the light emission step EMIS. The second switch element M42 includes a gate electrode connected to a second gate line to which the second EM pulse EM2(*n*) is applied, a first electrode connected to the third node DRS, and a second electrode connected to the anode electrode of the light emitting element EL via the fourth node n4.

The third switch element M43 is turned on according to the gate-on voltage VGH of the third scan pulse SCAN3(*n*) to connect the third node DRS to the INIT line INI to which the initialization voltage Vinit is applied in the initialization step INIT. The third switch element M43 includes a gate electrode connected to the third gate line to which the third scan pulse SCAN3(*n*) is applied, a first electrode connected to the third node DRS, and a second electrode connected to the INIT line INI.

The fourth switch element M44 is turned on according to the gate-on voltage VGH of the second scan pulse SCAN2 (*n*) to supply the reference voltage Vref to the second node DRG in the initialization step INIT and the sampling step SMPL. The fourth switch element M44 includes a gate electrode connected to the fourth gate line to which the second scan pulse SCAN2(*n*) is applied, a first electrode to which the reference voltage Vref is applied, and a second electrode connected to the second node DRG.

The fifth switch element M45 is turned off according to the gate-off voltage VGL of the first EM pulse EM1(*n*) to block an electric current path between the first node DRD and the VDD line to which the pixel driving voltage ELVDD is applied in the initialization step INIT and the addressing step WR. The fifth switch element M45 is turned on according to the gate-on voltage VGH of the first EM pulse EM1(*n*) to connect the VDD line to the first node DRD in the sampling step SMPL and the light emission step EMIS. The fifth switch element M45 includes a gate electrode connected to the fifth gate line to which the first EM pulse EM1(*n*) is applied, a first electrode connected to the VDD line, and a second electrode connected to the first node DRD.

The EM generator 122 may include the circuit shown in FIG. 19 according to the fifth embodiment.

Referring to FIG. 19, the EM generator 122 includes first to sixth switch elements T41 to T46. The switch elements T41 to T46 may be implemented as an n-channel oxide TFT.

The EM generator 122 receives the first and third scan pulses SCAN1(*n*) and SCAN3(*n*), and outputs the second EM pulse EM2(*n*).

The first EM switch element T41 includes a gate electrode connected to the pull-up control node 191, a first electrode to which the gate driving voltage VDD is applied, and a second electrode connected to the output node. The second EM switch element T42 includes a gate electrode connected to the pull-down control node 192, a first electrode connected to the output node, and a second electrode connected to the VSS node to which the gate reference voltage VSS is applied.

The third EM switch element T43 is turned on according to the gate-on voltage VGH of the first scan pulse SCAN1(*n*) to charge the pull-up control node 191. The fourth EM switch element T44 is turned on according to the gate-on voltage VGH of the third scan pulse SCAN3(*n*) to discharge the pull-up control node 191. The third EM switch element T43 includes a gate electrode to which the first scan pulse SCAN1(*n*) is applied, a first electrode to which the gate driving voltage VDD is applied, and a second electrode connected to the pull-up control node 191. The fourth EM switch element T44 includes a gate electrode to which the third scan pulse SCAN3(*n*) is applied, a first electrode connected to the pull-up control node 191, and a second electrode connected to the VSS node.

The fifth EM switch element T45 is turned on according to the gate-on voltage VGH of the third scan pulse SCAN3(*n*) to charge the pull-down control node 192. The sixth EM switch element T46 is turned on according to the gate-on voltage VGH of the first scan pulse SCAN1(*n*) to discharge the pull-down control node 192. The fifth EM switch element T45 includes a gate electrode to which the third scan pulse SCAN3(*n*) is applied, a first electrode to which the gate driving voltage VDD is applied, and a second electrode connected to the pull-down control node 192. The sixth EM switch element T46 includes a gate electrode to which the first scan pulse SCAN1(*n*) is applied, a first electrode connected to the pull-down control node 192, and a second electrode connected to the VSS node.

In order to drive the pixel circuit shown in FIG. 17, the gate driver 120 may include a first shift register which sequentially outputs the first scan pulse SCAN1(*n*), a second shift register which sequentially outputs the second scan pulse SCAN2(*n*), a third shift register which sequentially outputs the third scan pulse SCAN3(*n*), and a fourth shift register that sequentially outputs the first EM pulse EM1(*n*). The EM generator 122 may generate the second EM pulse EM2(*n*) using a small number of transistors T41 to T46 as shown in FIGS. 18 and 19. The gate driver 120 does not require a separate shift register for outputting and shifting the second EM pulse EM2(*n*). Accordingly, since the circuit area occupied by the gate driving circuit is reduced, the bezel BZ of the display panel 100 can be narrowed.

Figure 20:
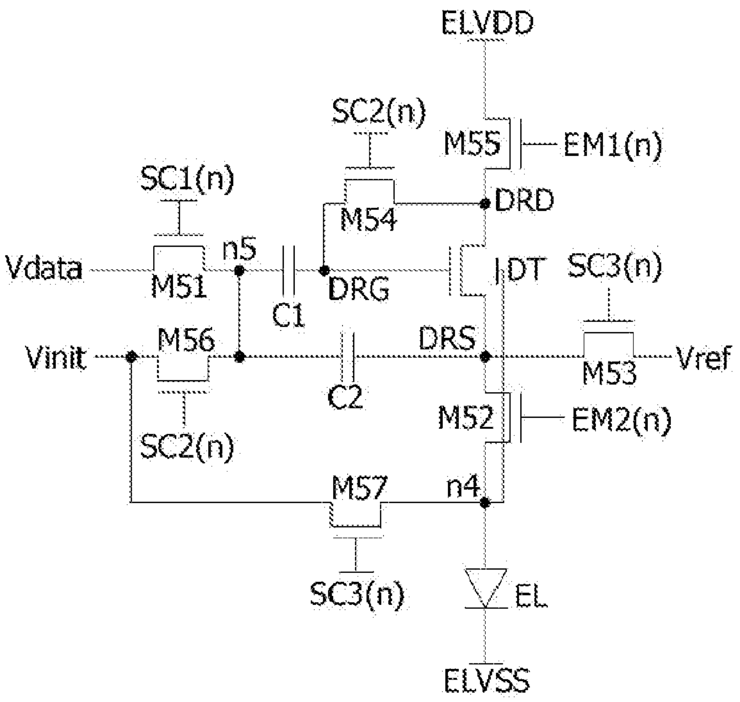
FIG. 20 is a circuit diagram showing a pixel circuit according to a sixth embodiment of this disclosure.
Figure 21:
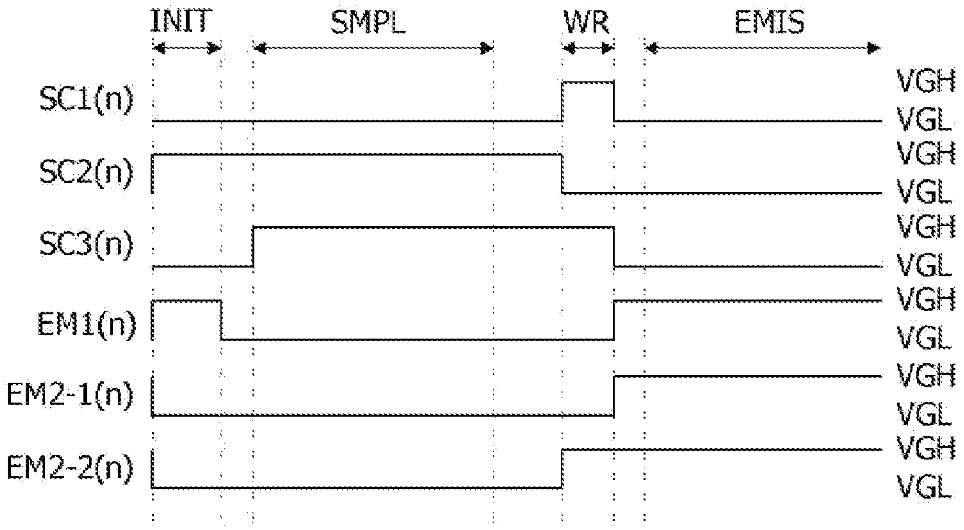
FIG. 21 is a waveform diagram showing a gate signal applied to the pixel circuit shown in FIG. 20 according to the sixth embodiment of this disclosure.
Figure 22:
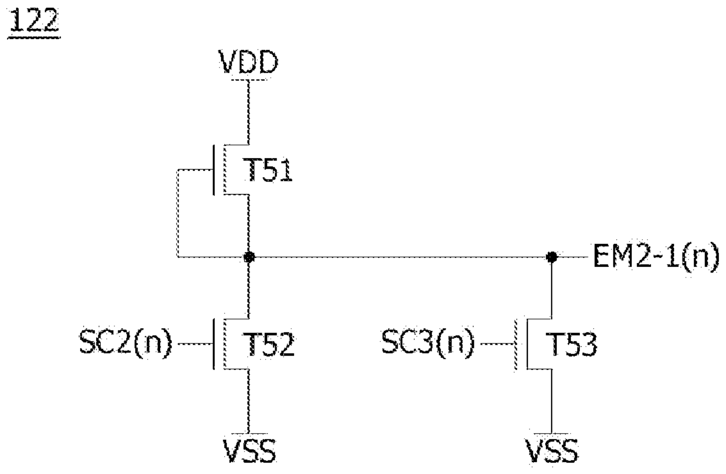
FIGS. 22 and 23 are circuit diagrams showing EM generators which generate a second EM pulse applied to the pixel circuit shown in FIG. 20 according to the sixth embodiment of this disclosure.
Figure 23:
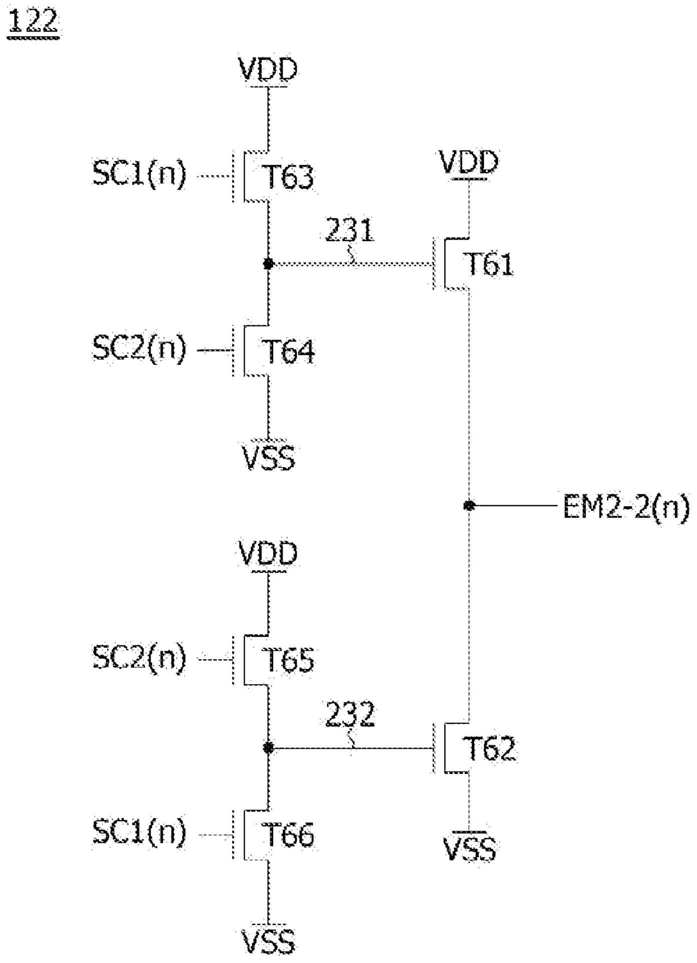

FIG. 20 is a circuit diagram showing a pixel circuit according to a sixth embodiment of this disclosure. FIG. 21 is a waveform diagram showing a gate signal applied to the pixel circuit shown in FIG. 20 according to the sixth embodiment. FIGS. 22 and 23 are circuit diagrams showing the EM generator 122 which generates the second EM pulse EM2(*n*) applied to the pixel circuit shown in FIG. 20 according to the sixth embodiment. The gate signal includes a first scan pulse SC1(*n*), a second scan pulse SC2(*n*), a third scan pulse SC3(*n*), a first EM pulse EM1(*n*), and a second EM pulse EM2-1(*n*), EM2-2(*n*).

In the sixth embodiment of this disclosure, it is possible to shift the threshold voltage of the driving element into a sensible voltage range by applying a preset voltage to the second gate electrode of the driving element DT in the internal compensation circuit of the diode connection method. As a result, according to this disclosure, the threshold voltage Vth of the driving element DT shifted to a voltage of 0 V or less can be shifted to a sensible voltage.

Referring to FIGS. 20 and 21, the pixel circuit includes a light emitting element EL, a driving element DT, first and second capacitors C1 and C2, and first to seventh switch elements M51 to M57. The driving element DT and the switch elements M51 to M57 may be implemented as an n-channel oxide TFT.

To this pixel circuit, a data voltage Vdata of pixel data, scan pulses SC1(*n*), SC2(*n*) and SC3(*n*), and EM pulses EM1(*n*), EM2-1(*n*) and EM2-2(*n*) as well as a constant voltage such as a pixel driving voltage ELVDD, a low-potential power supply voltage ELVSS, a reference voltage Vref, an initialization voltage Vinit, or the like are supplied. The voltages of the scan pulses SC1(*n*), SC2(*n*) and SC3(*n*), and the EM pulses EM1(*n*), EM2-1(*n*) and EM2-2(*n*) swing between the gate-on voltage VGH and the gate-off voltage VGL.

The constant voltage commonly applied to the pixels may be set to ELVDD>Vref>Vinit>ELVSS, but is not limited thereto. The reference voltage Vref may be set to a voltage greater than the initialization voltage Vinit so that a negative back-bias is applied to the driving element DT in the sampling step SMPL. The gate-on voltage VGH may be set to a voltage greater than the pixel driving voltage VDD. The gate-off voltage VGL may be set to a voltage less than the low-potential power supply voltage ELVSS.

The driving period of the pixel circuit may be divided into an initialization step INIT in which the pixel circuit is initialized, a sampling step SMPL in which the threshold voltage Vth of the driving element DT is sampled, an addressing step WR in which the data voltage Vdata is charged and pixel data is written, and a light emission step EMIS in which the light emitting element EL emits light.

The first scan pulse SC1(*n*) may be generated as a gate-on voltage VGH synchronized with the data voltage Vdata in the addressing step WR. The first scan pulse SC1(*n*) may be a gate-off voltage VGL in the initialization step INIT, the sampling step SMPL, and the light emission step EMIS.

The second scan pulse SC2(*n*) may rise to the gate-on voltage VGH prior to the third scan pulse SC3(*n*), and may fall to the gate-off voltage VGL prior to a falling edge of the third scan pulse SC3(*n*). The second scan pulse SC2(*n*) may be generated as the gate-on voltage VGH in the initialization step INIT and the sampling step SMPL. The second scan pulse SC2(*n*) may be the gate-off voltage VGL in the addressing step WR and the light emission step EMIS.

The third scan pulse SC3(*n*) may be generated as a gate-on voltage VGH in the sampling step SMPL and the addressing step WR. In the addressing step WR, the gate-on voltage section of the third scan pulse SC3(*n*) may overlap the gate-on voltage section of the first scan pulse SC1(*n*). After rising to the gate-on voltage VGH after the rising edge of the second scan pulse SC2(*n*), the third scan pulse SC3(*n*) may fall to the gate-off voltage VGL after the falling edge of the second scan pulse SC2(*n*). The third scan pulse SC3(*n*) may be the gate-off voltage VGL in the initialization step INIT and the light emission step EMIS.

The first EM pulse EM1(*n*) may be generated as the gate-on voltage VGH in the initialization step INIT and the light emission step EMIS. The first EM pulse EM1(*n*) may be generated as the gate-off voltage VGL in the sampling step SMPL and the addressing step WR.

The second EM pulse EM2-1(*n*), EM2-2(*n*) may be generated as one of the 2-1th EM pulse EM2-1(*n*) or the 2-2th EM pulse EM2-2(*n*).

The 2-1th EM pulse EM2-1(*n*) may be generated as the gate-off voltage VGL in the initialization step INIT, the sampling step SMPL, and the addressing step WR, while it may be the gate-on voltage VGH in the light emission step EMIS.

The 2-2 EM pulse EM2-2(*n*) may be generated as the gate-off voltage VGL in the initialization step INIT and the sampling step SMPL, while it may be a gate-on voltage VGH in the addressing step WR and the light emission step EMIS.

The anode electrode of the light emitting element EL may be connected to the fourth node n4, and a low-potential power supply voltage ELVSS may be applied to the cathode electrode of the light emitting element EL.

The first capacitor C1 may be connected between the second node n2 and the fifth node n5. The first capacitor C1 stores the threshold voltage Vth of the driving element DT in the sampling step SMPL. In the addressing step WR, the data voltage Vdata is transferred to the first gate electrode of the driving element DT through the first capacitor C1.

The second capacitor C2 is connected between the third node DRS and the fifth node n5. The second capacitor C2 stores the second electrode voltage, i.e., the source voltage, of the driving element DT at the beginning of the light emission step EMIS, and maintains the gate-source voltage Vgs of the driving element DT in the light emission step EMIS.

The driving element DT may be a MOSFET of a double gate structure. The driving element DT includes a first gate electrode connected to the second node DRG, a second gate electrode connected to the fourth node n4, a first electrode connected to the first node DRD, and a second electrode connected to the third node DRS. The first gate electrode and the second gate electrode of the driving element DT may overlap each other with a semiconductor pattern forming a semiconductor channel therebetween.

The first switch element M51 includes a first electrode connected to the data line to which the data voltage Vdata is applied, a second electrode connected to the fifth node n5, and a gate electrode to which the first scan pulse SC1(*n*) is applied. The first switch element M51 is turned on in the addressing step WR in response to the gate-on voltage VGH of the first scan pulse SC1(*n*) to supply the data voltage Vdata to the fifth node n5. In the initialization step INIT, the sampling step SMPL, and the light emission step EMIS in which the first switch element M51 is turned off, an electric current path between the data line and the fifth node n5 is blocked.

The second switch element M52 includes a first electrode connected to the third node DRS, a second electrode connected to the fourth node n4, and a gate electrode to which the second EM pulse EM2-1(*n*), EM2-2(*n*) is applied. The second switch element M52 is turned on in the light emission step EMIS, or in the addressing step WR and the light emission step EMIS in response to the gate-on voltage VGH of the second EM pulse EM2-1(*n*), EM2-2(*n*) to form an electric current path between the driving element DT and the light emitting element EL. When the second switch element M52 is in the off state, the electric current path between the driving element DT and the light emitting element EL is blocked, so that the light emitting element EL does not emit light.

The third switch element M53 includes a first electrode connected to the third node DRS, a second electrode to which the reference voltage Vref is applied, and a gate electrode to which the third scan pulse SC3(*n*) is applied. The third switch element M53 is turned on in the sampling step SMPL and the addressing step WR in response to the gate-on voltage VGH of the third scan pulse SC3(*n*) to supply the reference voltage Vref to the third node DRS. An electric current path between the REF line to which the reference voltage Vref is applied and the third node DRS is blocked in the initialization step INIT and the light emission step EMIS in which the third switch element M53 is turned off.

The fourth switch element M54 includes a first electrode connected to the first node DRD, a second electrode connected to the second node DRG, and a gate electrode to which the second scan pulse SC2(*n*) is applied. The fourth switch element M54 is turned on in the initialization step INIT and the sampling step SMPL in response to the gate-on voltage VGH of the second scan pulse SC2(*n*) to connect the first node DRD with the second node DRG. When the fourth switch element M54 is turned on, the first gate electrode and the first electrode are connected to each other so that the driving element DT operates as a diode.

The fifth switch element M55 includes a first electrode to which the pixel driving voltage ELVDD is applied, a second electrode connected to the first node DRD, and a gate electrode to which the first EM pulse EM1(*n*) is applied. The fifth switch element M55 is turned on in the initialization step INIT and the light emission step EMIS in response to the gate-on voltage VGH of the first EM pulse EM1(*n*) to supply the pixel driving voltage ELVDD to the first node DRD. An electric current path between the VDD line to which the pixel driving voltage ELVDD is applied and the first node DRD is blocked in the sampling step SMPL and the addressing step WR in which the fifth switch element M55 is turned off.

The sixth switch element M56 includes a first electrode to which the initialization voltage Vinit is applied, a second electrode connected to the fifth node n5, and a gate electrode to which the second scan pulse SC2(*n*) is applied. The sixth switch element M56 is turned on in the initialization step INIT and the sampling step SMPL in response to the gate-on voltage VGH of the second scan pulse SC2(*n*) to supply the initialization voltage Vinit to the fifth node n5. An electric current path between the INIT line to which the initialization voltage Vinit is applied and the fifth node n5 is blocked in the addressing step WR and the light emission step EMIS in which the sixth switch element M56 is turned off.

The seventh switch element M57 includes a first electrode to which the initialization voltage Vinit is applied, a second electrode connected to the fourth node n4, and a gate electrode to which the third scan pulse SC3(*n*) is applied. The seventh switch element M57 is turned on in the sampling step SMPL and the addressing step WR in response to the gate-on voltage VGH of the third scan pulse SC3(*n*) to supply the initialization voltage Vinit to the fourth node n4. When the seventh switch element M57 is turned on, the reference voltage Vref is applied to the third node DRS through the third switch element M53. An electric current path between the INIT line to which the initialization voltage Vinit is applied and the fourth node n4 is blocked in the initialization step INIT and the light emission step EMIS in which the seventh switch element M57 is turned off.

In the sixth embodiment of this disclosure, the threshold voltage Vth of the driving element DT may be sampled by applying the reference voltage Vref to the third node DRS in the sampling step SMPL, and the sampling step SMPL and the addressing step WR may be separated by applying the data voltage Vdata to the fifth node n5 in the addressing step WR. As a result, the sixth embodiment can ensure that the time of the sampling step SMPL is sufficiently long, for example, as long as two or more horizontal periods.

The EM generator 122 may include the circuit shown in FIGS. 22 and 23 according to the sixth embodiment.

Referring to FIG. 22, the EM generator 122 includes first to third switch elements T51, T52, and T53. The EM generator 122 receives the second and third scan pulses SC2(*n*) and SC3(*n*), and outputs a 2-1th EM pulse EM2-1 (*n*). The EM switch elements T51, T52 and T53 may be implemented as an n-channel oxide TFT.

The 2-1th EM pulse EM2-1(*n*) is generated as a gate-off voltage VGL when the second or third scan pulse SC2(*n*), SC3(*n*) is the gate-on voltage VGH. The 2-1th EM pulse EM2-1(*n*) is generated as a gate-on voltage in at least some period of the light emission step EMIS.

A gate driving voltage VDD is applied to the first electrode of the first EM switch element T51. A gate electrode and a second electrode of the first EM switch element T51 are connected to an output node. The second EM switch element T52 is turned on according to the gate-on voltage VGH of the second scan pulse SCAN2(*n*) to discharge the voltage of the output node to the gate reference voltage VSS. The second EM switch element T52 includes a gate electrode to which the second scan pulse SC2(*n*) is applied, a first electrode connected to the output node, and a second electrode connected to the VSS node. The third EM switch element T53 is turned on according to the gate-on voltage VGH of the third scan pulse SCAN3(*n*) to discharge the voltage of the output node to the gate reference voltage VSS. The third EM switch element T53 includes a gate electrode to which the third scan pulse SC3(*n*) is applied, a first electrode connected to the output node, and a second electrode connected to the VSS node.

Referring to FIG. 23, the EM generator 122 includes first to sixth EM switch elements T61 to T66. The EM generator 122 receives the first and second scan pulses SC1(*n*) and SC2(*n*), and outputs a 2-2th EM pulse EM2-2(*n*). The EM switch elements T61 and T66 may be implemented as an n-channel oxide TFT.

The 2-2th EM pulse EM2-2(*n*) is generated as the gate-off voltage VGL when the second scan pulse SC2(*n*) is the gate-on voltage VGH, while it is generated as the gate-on voltage in the addressing step WR and at least some period of the light emission step EMIS.

The first EM switch element T61 is turned on when the pull-up control node 231 is charged to supply the gate-on voltage VGH to the output node from which the 2-2th EM pulse EM2-2(*n*) is output. When the pull-down control node 232 is charged, the second EM switch element T62 is turned on to discharge the output node. The third EM switch element T63 is turned on according to the gate-on voltage VGH of the first scan pulse SC1(*n*) to charge the pull-up control node 231. The fourth EM switch element T64 is turned on according to the gate-on voltage VGH of the second scan pulse SC2(*n*) to discharge the pull-up control node 231. The fifth EM switch element T65 is turned on according to the gate-on voltage VGH of the second scan pulse SC2(*n*) to charge the pull-down control node 232. The sixth EM switch element T66 is turned on according to the gate-on voltage VGH of the first scan pulse SC1(*n*) to discharge the pull-down control node 232.

The first EM switch element T61 includes a gate electrode connected to the pull-up control node 231, a first electrode to which the gate driving voltage VDD is applied, and a second electrode connected to the output node. The second EM switch element T62 includes a gate electrode connected to the pull-down control node 232, a first electrode connected to the output node, and a second electrode connected to the VSS node to which the gate reference voltage VSS is applied.

The third EM switch element T63 is turned on according to the gate-on voltage VGH of the first scan pulse SC1(*n*) to charge the pull-up control node 231. The fourth EM switch element T64 is turned on according to the gate-on voltage VGH of the second scan pulse SC2(*n*) to discharge the pull-up control node 231. The third EM switch element T63 includes a gate electrode to which the first scan pulse SC1(*n*) is applied, a first electrode to which the gate driving voltage VDD is applied, and a second electrode connected to the pull-up control node 231. The fourth EM switch element T64 includes a gate electrode to which the second scan pulse SC2(*n*) is applied, a first electrode connected to the pull-up control node 231, and a second electrode connected to the VSS node.

The fifth EM switch element T65 is turned on according to the gate-on voltage VGH of the second scan pulse SC2(*n*) to charge the pull-down control node 232. The sixth EM switch element T66 is turned on according to the gate-on voltage VGH of the first scan pulse SC1(*n*) to discharge the pull-down control node 232. The fifth EM switch element T65 includes a gate electrode to which the second scan pulse SC2(*n*) is applied, a first electrode to which the gate driving voltage VDD is applied, and a second electrode connected to the pull-down control node 232. The sixth EM switch element T66 includes a gate electrode to which the first scan pulse SC1(*n*) is applied, a first electrode connected to the pull-down control node 232, and a second electrode connected to the VSS node.

In order to drive the pixel circuit shown in FIG. 20, the gate driver 120 may include a first shift register which sequentially outputs the first scan pulse SC1(*n*), a second shift register which sequentially outputs the second scan pulse SC2(*n*), a third shift register which sequentially outputs the third scan pulse SC3(*n*), and a fourth shift register that sequentially outputs the first EM pulse EM1(*n*). The EM generator 122 may generate the second EM pulses EM2-1 (*n*), EM2-2(*n*) using a small number of transistors T51 to T53 and T61 to T66 as shown in FIGS. 21 to 23. The gate driver 120 does not require a separate shift register for outputting and shifting the second EM pulse EM2-1(*n*), EM2-2(*n*). Accordingly, since the circuit area occupied by the gate driving circuit is reduced, the bezel BZ of the display panel 100 can be narrowed.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode of the driving element that is connected to a first node to which a pixel driving voltage is applied, a gate electrode of the driving element that is connected to a second node, and a second electrode of the driving element that is connected to a third node, the driving element configured to supply an electric current;

a light emitting element configured to emit light according to the electric current;

a first switch element connected to the gate electrode of the driving element at the second node, the first switch element configured to supply a data voltage to the gate electrode of the driving element according to a first signal received by the first switch element;

a second switch element connected between the light emitting element and the second electrode of the driving element at the third node, the second switch element configured to be turned on according to a second signal received by the second switch element;

a third switch element connected to the second electrode of the driving element and the second switch element at the third node, the third switch element configured to be turned on and supply a reference voltage to the third node according to a third signal received by the third switch element; and a first capacitor connected to the second node and the third node, wherein a level of the second signal is opposite of one of a level of the first signal received by the first switch element or a level of the third signal received by the third switch element, wherein the first signal and the third signal are a same signal.

2. The pixel circuit of claim 1, wherein the first switch element includes a gate electrode of the first switch element that receives the first signal, a first electrode of the first switch element that is connected to a data line that supplies the data voltage to the first switch element, and a second electrode of the first switch element that is connected to the gate electrode of the driving element and a first electrode of the first capacitor at the second node.

3. The pixel circuit of claim 2, wherein the second switch element includes a gate electrode of the second switch element that receives the second signal, a first electrode of the second switch element that is connected to the second electrode of the driving element and a second electrode of the first capacitor at the third node, and a second electrode of the second switch element that is connected to an anode electrode of the light emitting element.

4. The pixel circuit of claim 3, wherein the third switch element includes a gate electrode of the third switch element that receives the third signal, a first electrode of the third switch element that is connected to the second electrode of the driving element, the second electrode of the first capacitor, and the first electrode of the second switch element at the third node, and a second electrode of the third switch element that is connected to a reference line that supplies the reference voltage.

5. The pixel circuit of claim 4, further comprising:

an analog-to-digital converter;

a sampling switch element connected to the reference line, the sampling switch element configured to switch between connecting the reference line to the analog-to-digital converter and connecting the reference line to a power line that supplies the reference voltage to the reference line; and a second capacitor connected to the reference line, the second capacitor configured to store a voltage of the third node.

6. The pixel circuit of claim 1, wherein the level of the second signal changes between a first level and a second level that is greater than the first level, and while the second signal is at the first level one of the first signal or the third signal is at the second level, and while the second signal is at the second level one of the first signal or the third signal is at the first level.

7. A display device comprising:

a display panel including a plurality of data lines, a plurality of gate lines that cross the plurality of data lines, a plurality of power lines, and a plurality of pixel circuits connected with the plurality of data lines, the plurality of gate lines, and the plurality of power lines;

a data driver configured to supply a data voltage of pixel data to the plurality of data lines; and a gate driver configured to supply a scan pulse and a light emitting control pulse to the plurality of gate lines, wherein each of the plurality of pixel circuits includes:

a driving element including a first electrode of the driving element that is connected to a first node to which a pixel driving voltage is applied, a gate electrode of the driving element that is connected to a second node, and a second electrode of the driving element that is connected to a third node, the driving element configured to supply an electric current;

a light emitting element configured to emit light according to the electric current;

a first switch element configured to be turned on according to a gate-on voltage of the scan pulse and supply a data voltage to the gate electrode of the driving element at the second node;

a second switch element configured to be turned off according to a gate-off voltage of the light emitting control pulse; and a third switch element configured to be turned on according to a gate-on voltage of the sensing pulse and supply a reference voltage to the third node;

a capacitor connected to the gate electrode of the driving element at the second node and the second electrode of the driving element at the third node, and wherein the light emitting control pulse changes between a first level and a second level that is greater than the first level, and while the light emitting control pulse is at the first level the scan pulse is at the second level, and while the light emitting control pulse is at the second level the scan pulse is at the first level.

8. The display device of claim 7, wherein the first switch element includes a gate electrode of the first switch element that receives the scan pulse, a first electrode of the first switch element that is connected to a data line that supplies the data voltage to the first switch element, and a second electrode of the first switch element that is connected to the gate electrode of the driving element and a first electrode of the capacitor at the second node.

9. The display device of claim 8, wherein the second switch element includes a gate electrode of the second switch element that receives the light emitting control pulse, a first electrode of the second switch element that is connected to the second electrode of the driving element and a second electrode of the capacitor at the third node, and a second electrode of the second switch element that is connected to an anode electrode of the light emitting element.

10. The display device of claim 7, wherein the gate driver includes:

a first emission switch element including a first electrode of the first emission switch element to which the gate-on voltage is applied, a second electrode and a gate electrode of the first emission switch element that are connected to an output node from which the light emitting control pulse is output; and a second emission switch element including a gate electrode of the second emission switch element to which the scan pulse is applied, a first electrode of the second emission switch element that is connected to the gate electrode of the first emission switch element and the second electrode of the first emission switch element at the output node, and a second electrode of the second emission switch element to which the gate-off voltage is applied.

11. The display device of claim 7, wherein the gate driver includes:

a first emission switch element including a first electrode of the first emission switch element to which the gate-on voltage is applied, a second electrode and a gate electrode of the first emission switch element that are connected to an output node from which the light emitting control pulse is output; and a second emission switch element including a gate electrode of the second emission switch element to which the sensing pulse is applied, a first electrode of the second emission switch element that is connected to the gate electrode of the first emission switch element and the second electrode of the first emission switch element at the output node, and a second electrode of the second emission switch element to which the gate-off voltage is applied.

12. A pixel circuit comprising:

a driving element including a first electrode of the driving element that is connected to a first node to which a pixel driving voltage is applied, a gate electrode of the driving element that is connected to a second node, and a second electrode of the driving element that is connected to a third node, the driving element configured to supply an electric current to a light emitting element;

a first switch element configured to be turned on according to a gate-on voltage of a scan pulse to supply a data voltage to the second node;

a second switch element configured to be turned off according to a gate-off voltage of a light emitting control pulse generated in antiphase of the scan pulse;

a third switch element configured to be turned on according to the gate-on voltage of the scan pulse to supply a reference voltage to the third node; and a capacitor configured to be connected between the second node and the third node.

13. The pixel circuit of claim 12, wherein the first switch element includes a gate electrode of the first switch element that is connected to a first gate line to which the scan pulse is applied, a first electrode of the first switch element that is connected to a data line to which the data voltage is applied, and a second electrode of the first switch element that is connected to the second node, and wherein the second switch element includes a gate electrode of the second switch element that is connected to a second gate line to which the light emitting control pulse is applied, a first electrode of the second switch element that is connected to the third node, and a second electrode of the second switch element that is connected to an anode electrode of the light emitting element.

14. The pixel circuit of claim 12, wherein the first switch element includes a gate electrode of the first switch element that is connected to a first gate line to which the scan pulse is applied, a first electrode of the first switch element that is connected to a data line to which the data voltage is applied, and a second electrode of the first switch element that is connected to the second node, wherein the second switch element includes a gate electrode of the second switch element that is connected to a second gate line to which the light emitting control pulse is applied, a first electrode of the second switch element that is connected to the third node, and a second electrode of the second switch element that is connected to an anode electrode of the light emitting element, and wherein the third switch element includes a gate electrode of the third switch element that is connected to the first gate line, a first electrode of the third switch element that is connected to the third node, and a second electrode of the third switch element that is connected to a power line to which the reference voltage is applied.

* * * * *